United States Patent
Hunt et al.

(10) Patent No.: US 6,885,674 B2
(45) Date of Patent: Apr. 26, 2005

(54) COMMUNICATIONS SYSTEM FOR PROVIDING BROADBAND COMMUNICATIONS USING A MEDIUM VOLTAGE CABLE OF A POWER SYSTEM

(75) Inventors: Philip G. Hunt, Hampstead, NH (US); Paul M. Riley, Nashua, NH (US); Lowell E. Kopp, Winchester, MA (US)

(73) Assignee: Amperion, Inc., Andover, MA (US)

( * ) Notice: Subject to any disclaimer, the term of this patent is extended or adjusted under 35 U.S.C. 154(b) by 138 days.

(21) Appl. No.: 10/447,456

(22) Filed: May 28, 2003

(65) Prior Publication Data

US 2003/0224784 A1 Dec. 4, 2003

Related U.S. Application Data

(60) Provisional application No. 60/383,838, filed on May 28, 2002.

(51) Int. Cl.[7] .......................... H04L 12/28; H04L 12/56
(52) U.S. Cl. ....................... 370/420; 370/353; 370/401
(58) Field of Search .............................. 370/420, 338, 370/340, 315, 352, 353, 354, 389, 392, 400, 401, 402, 421, 422

(56) References Cited

U.S. PATENT DOCUMENTS

| | | | |
|---|---|---|---|
| 5,684,826 A | 11/1997 | Ratner | ........................ 375/222 |
| 5,864,284 A | 1/1999 | Sanderson | |
| 5,892,758 A | * 4/1999 | Argyroudis | .................. 370/335 |
| 5,922,047 A | 7/1999 | Newlin et al. | ............... 709/217 |
| 5,937,342 A | 8/1999 | Kline | |
| 5,982,276 A | 11/1999 | Stewart | |
| 6,040,759 A | * 3/2000 | Sanderson | ............. 340/310.01 |
| 6,243,571 B1 | 6/2001 | Bullock et al. | |
| 6,452,482 B1 | 9/2002 | Cern | |
| 2002/0002040 A1 | 1/2002 | Kline et al. | |
| 2002/0097953 A1 | 7/2002 | Kline | |
| 2002/0110310 A1 | 8/2002 | Kline | |
| 2002/0159512 A1 | 10/2002 | Matsumoto | |

* cited by examiner

Primary Examiner—Phirin Sam
(74) Attorney, Agent, or Firm—Ware, Fressola, Van Der Sluys & Adolphson LLP

(57) ABSTRACT

A broadband service communication system using an MV cable for conveying RF signals in a network segment, which includes a distribution center (PLT controller) and a plurality of power line telecommunication (PLT) stations. The PLT controller has a distribution modem for conveying downstream and upstream RF signals to and from the PLT stations through the MV cable via couplers. Each PLT station has a modem for conveying the downstream and upstream RF signals via couplers and for conveying media signals to one or more customer premises equipment (CPE) via, e.g. wireless links. The PLT controller controls each PLT station regarding upstream communications transfer of all downstream communications and also controls. The PLT controller can be connected via a router to a WAN to convey media signals to and from the WAN. Repeaters and interlinks are used to join multiple network segments.

33 Claims, 17 Drawing Sheets

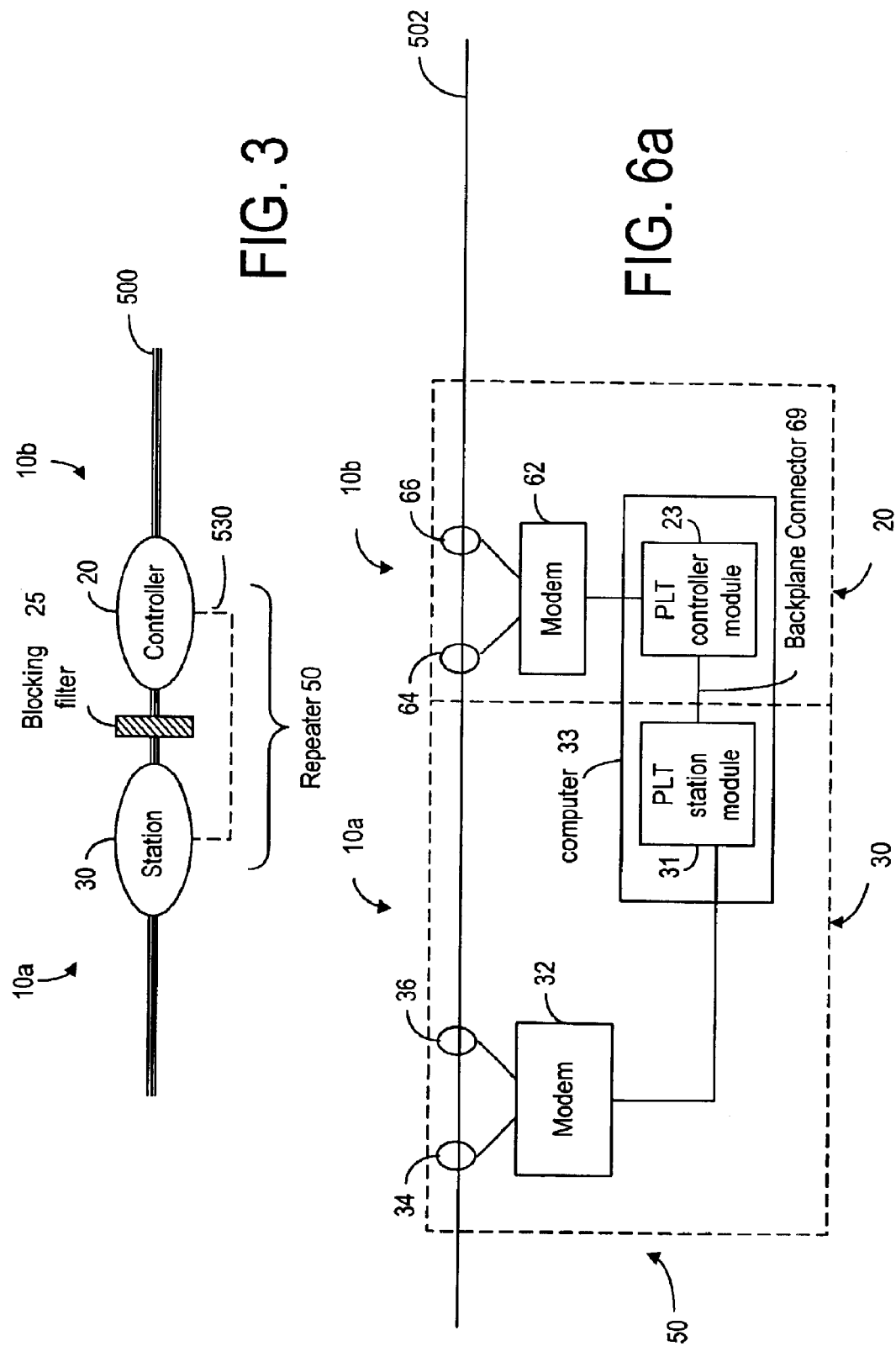

A: Backhaul to Distribution modem uplink
B: Distribution modem

A: Backhaul to Distribution modem uplink
B: Distribution modem

COMMUNICATIONS SYSTEM FOR PROVIDING BROADBAND COMMUNICATIONS USING A MEDIUM VOLTAGE CABLE OF A POWER SYSTEM

This patent application is based on and claims priority under 35 U.S.C. §119(e) to U.S. Provisional Application No. 60/383,838, filed May 28, 2002.

FIELD OF THE INVENTION

The present invention relates to power line communications (PLC), namely, the providing of broadband communications services using one or more medium voltage cables of a power distribution network, while the power distribution network is supplying electrical power generated by a power generation system.

BACKGROUND OF THE INVENTION

Overview

The present invention relates to communications services using the power distribution network. The following provides a general background of a power generation system used to supply power to the power distribution network, general background of a power transmission system, a power transmission system, a power distribution network, as well as background information concerning power line communications; that is, the use of the power distribution network to deliver information.

Power Generation System

Power is provided to users worldwide through the use of three distinct systems. A power generation system, typically located at a power generation facility, converts some form of potential or kinetic energy into electricity through the use of electrical generators. These generators are typically powered by combustion, hydroelectric, wind, or nuclear power sources.

Power Transmission System

The power transmission system is typically electrically connected to a power generation system, and delivers the generated electricity over a large distance from the Generation system to the localities where that electricity is consumed. The power transmission system consists of transformers which, from the generated power, produce High Voltage (HV), known in the art to be voltages from 60,000 to 1,000,000 volts. The Transmission System may carry either Alternating Current (AC) or Direct Current (DC), and typically uses what are known as "high tension" electrical wires (cable) for transmission. The power transmission system typically ends at one or more power substations, which are geographically close to the consumers of the electricity. Power transmission systems use large transformers, overload and lightning protection devices, switches, and various network sensing and control devices. Power Transmission wires are typically overhead, and the electrical wires are usually fabricated from un-insulated aluminum.

Power Distribution Network

A power distribution network is a series of electrical wires (cables) and components used to deliver power from the substation to the individual consumers of electricity. Distribution networks typically use Medium Voltage (MV), known in the art to be from 4,000 to 50,000 volts, and almost always use AC. Located in locations convenient to the power supplier, transformers connect to the MV Power Distribution System and produce Low Voltage (LV) electricity at from 90 to 600 volts AC, which is delivered to the consumers of the electricity. A single LV transformer may power one customer, several customers, or hundreds of customers. Power Distribution systems use transformers, switches, reclosers, lightning and fault protection devices, capacitors, meters, and other sense and control devices. Power Distribution wires may be overhead, where they may be insulated or un-insulated. They may also be underground wires (cables), which typically contain a center power conductor surrounded by one or more ground leads in a coaxial arrangement.

Power Distribution Networks are often deployed in a tree-like topology, with the root of the tree located at the substation, and the major trunks known as "feeders" extending from this location. Each feeder in turn has multiple branches, also known in the art as "laterals", which extend from the feeders outward. A lateral may in turn feed several other laterals. The feeders and laterals often extend 25 km (15.54 miles) or more from the substation.

Very often the "leaves" of the tree, or outermost laterals, are arranged in geographic loops, such that there are multiple paths to any consumer from the substation. Because these loops produce a safety and fault detection and correction problem, they are typically opened in one place by an automatic switch or a manual Normally Open Point. In the event of an outage, the normally open point can be closed, providing an alternate electricity flow path and reducing the number of consumers effected by the fault condition.

Power Line Communications (PLC) is the art of re-using the Power Transmission System and Power Distribution Network for the delivery of information. As is known in the art, PLC system are divided into two categories: Customer Premises (CP) networks, which operate completely on LV power within the electric consumer's premises; and Access networks, which operate on the Transmission and/or Distribution networks, at HV or MV. PLC systems and devices superimpose an information signal on 50 or 60 Hz power signal, such that the power distribution devices are unaffected by the additional signal.

PLC may use narrowband or broadband data transmission. Narrowband PLC has been in use since the 1970's for transmission of control and sense signals across the Transmission and Distribution networks, by and for the electric utility. Very often these systems generate high-frequency pulses during the 50 or 60 Hz zero-crossing period, and use these pulses or their absence to carry information (e.g. electrical utility meter readings, etc.).

Broadband PLC, which transports e.g. 1 Mb/s or more of information, typically uses spread-spectrum or frequency-hopping techniques. Such techniques are used because power lines do not readily transport signals above the 50 or 60 Hz for which they were designed. Higher frequencies are attenuated quickly, and overhead wires particularly are very noisy, carrying radio and television signals, as well as other narrowband and broadband noise. Because governmental electromagnetic interference regulations prohibit simply increasing the PLC power levels above those noise levels, PLC modulation schemes typically are designed such that they statically or dynamically avoid the noise. Additionally, the signals may be adjusted manually or automatically to counteract the signal attenuation introduced by various components of the Transmission or Distribution system.

PLC is sometimes used to carry packetized data, using protocols such as the Internet Protocol (IP), the Transmission Control Protocol (TCP), and the User Datagram Protocol (UDP). Other protocols, such as Appletalk, may also be used. In these cases, the PLC network may operate in the data realm as a collection of data forwarding elements including repeaters (which operate in what is known in the art as the International Standards Organization (ISO) Open System Interconnection (OSI) reference model, layer 1, bridges or data switches, which operate at OSI layer 2, routers, which operate at OSI layer 3, or gateways, which operate at OSI layers 4–7.

There is no constraint that the data network is topologically aligned to the power Transmission or Distribution network. For example, a data signal may well traverse the power lines from a lateral or feeder toward a substation, which power would never do. Similarly, even if the superimposed PLC data network were arranged in a tree topology, the root node may or may not correspond to the root node of the Power Distribution System (the substation). The PLC network may in fact use loops or complex mesh topologies, using protocols known in the art, such as the International Electrical and Electronic Engineering (IEEE) 802.1D spanning tree, the Routing Information Protocol (RIP), or the Open Shortest Path First (OSPF) protocol to determine a packet's path across the PLC network.

PLC networks may also transport un-packetized voice or video streams, such as those used for telephony or cable television systems. Telephony streams may be formatted using standard telephony framing methods, commonly known in the art as T1, E1, or Synchronous Optical Network (SONET) framing. Video signals may use modulation, encoding, and framing techniques such as National Television System Committee (NTSC), Digital Video Broadcast (DVB), or Moving Picture Experts Group (MPEG).
PLC As stated above, high speed RF (radio frequency) communications, such as broadband, can be implemented over the medium voltage electric power lines of a power distribution network, subject to many constraints. As can be seen from FIG. 1, the physical topology of the network resembles the branching of a tree. The root of the tree corresponds to the medium voltage feeder as it leaves the power transmission system substation, or the point on a branch where it connects to the feeder. The feeder is a three-phase, three-wire power line with a ground conductor. At various intervals down the line, branches leave the main feeder to further distribute the power. The branches may be three-phase, any two of the three phases, or any single phase. Branches are rarely terminated, other than by the last transformer or other power distribution component needed for the delivery of power. Various switching components (including manual switches, automated reclosers and sectionalizers, as well as fuses) are inserted at appropriate locations to manage line faults and control the distribution of power. The squares labeled "R" and "S" in FIG. 1 are "Recloser" and "Sectionalizer". Reclosers and sectionalizers are typical automatic switch-gear. Other components (capacitors and regulator transformers) may be present to adjust the power factor or voltage levels along the line. Any of these components may present barriers to propagation of the RF signals, and may require additional devices to create RF bridges around them. The length of the power line from the root to the most distant branch tip may be 25 km or more. It appears very likely that some network stations will not be able to "hear" other stations in the network because of the attenuation of RF signals over a large distance between stations, or the RF barriers along the power line. This last point implies that a peer-to-peer network architecture is not appropriate for this system.

In a typical power distribution network, loops may be formed by switch closures made to restore lost power to an area, or for other reasons such as load balancing or line redundancy. All along the MV lines, distribution transformers convert the 4–30 KV voltage levels of the Medium Voltage power lines down to 110–600 V range of the Low Voltage (LV) power lines.

The power line environment, especially when using overhead lines, is electrically noisy, with many narrowband noise sources, and significant broadband noise. A communications system functioning in this environment must use every practical means of improving its noise resistance.

It is expected that the power line noise and RF transmission characteristics may change with the weather, as well as with the degree and kind of electrical loads connected to the line. The topology of any particular power line may produce unique reflection patterns or resonance conditions that may degrade the medium with respect to communications usage. It follows that the MV power line communication system must be adaptable to changing environmental characteristics, and must not be dependent on any single frequency (i.e., it cannot be a narrow-band system.)

The primary function of the power line is to deliver power. The communications network may not compromise that function. Thus, no communications device may be inserted into the line, breaking any of the power conductors. It follows that it may be technically challenging to produce coupling devices which introduce RF signals onto the power medium and extract RF signals from the medium. It may also be difficult to isolate RF signals on the power line from each other, as the medium may not be conducive to the filtering of high frequency signals, and as such low level protocols must be able to identify and reject traffic leaking into a network segment from other nearby segments.

Data communications over the power line are bi-directional, and must function over the three-phase line as well as any single-phase line. This constraint implies that communications reverse directions on the line in a time dependent manner (used as a truly half-duplex medium), or the medium is used in a full-duplex mode, with frequency domain multiplexing to provide the required bi-directionality.

The principal function of the MV power line RF network is that of an access network. Customers subscribe to communications access as a means to reach the Internet, or as a means to implement a virtual private network over a shared medium. The MV power line network is not a local area network.

It is advantageous and desirable to provide a broadband communications service over the medium voltage distribution network while meeting the above-described constraints.

SUMMARY OF THE INVENTION

The present invention provides a communications system for providing broadband communications between a distribution center and at least one remote location, together defining a network segment, where a medium voltage (MV) cable of an electrical power distribution system serves as a communication channel (medium) for the network segment, the communication system comprising:

a power line telecommunications (PLT) controller having:
    a distribution modem (62) for receiving a first (downstream) media signal so as to generate a first (downstream) RF signal that is modulated by said first media signal and for demodulating a second (upstream) RF signal so as to extract a second (upstream) media signal, the distribution modem including means (64, 66), in cooperative engagement with the MV cable, for exciting the MV cable with the first (downstream) RF signal for receiving the second (upstream) RF signal on the MV cable, a power line telecommunications (PLT) controller module (23) operatively communicating with the distribution modem, having means for controlling the generation of the first (downstream) media signal so as to cause at least one of the at least one remote locations to extract the first (downstream) media signal, the PLT controller module further having means for controlling the generation of a second (upstream) media signal at the at least one remote location; and at least one power line telecommunications (PLT) station (30), each station having:

a second modem (32) for demodulating the first (downstream) RF signal so as to extract the first (downstream) media signal, the second modem having means (34, 36), in cooperative engagement with the MV cable for receiving the first (downstream) RF signal and for exciting said MV cable with the second (upstream) RF signal, and a PLT station module (31) operatively communicating with the second modem (32), having means for accepting the extracted first (downstream) media signal if the signal is intended for the PLT station; and further having means for generating the second (upstream) media signal for presentation to the second modem for modulation thereof to form the second (upstream) RF signal;

whereby the PLT controller controls generation of all first (downstream) RF signals for distribution to the at least one PLT station and further controls the generation of second (upstream) RF signals to the PLT controller from the at least one PLT station.

Preferably, at least one of the first and the second media signals is conveyed to or from the distribution modem by a radio frequency link.

Typically, the couplers are used to inject or extract the communications signal to or from the electrical power network. As is known in the art, there are two common types of couplers. Capacitive couplers use standard capacitive effects in order to link the two signals at high frequency, while isolating the data and power signals at 0 to 60 Hz. A capacitive coupler is electrically a capacitor, with one plate attached to the HV, MV, or LV conductor, and the other plate connected to the communications signal source or destination. Insulation between the capacitor's plates provides isolation of the two networks.

Another coupling approach is known in the art as "inductive coupling", which uses standard electromagnetic effects in order to link the two signals at high frequency, while isolating the data and power signals at 0 to 60 Hz. An inductive coupler is electrically a transformer, with one coil formed by the HV, MV, or LV conductor (single turn coil), and the other coil connected to the communications signal source or destination. Insulation between the two coils provides isolation of the two networks.

PLC couplers typically link the two networks at frequencies from 1 MHz to 50 MHz or higher, and isolate the two networks at frequencies from DC to 100 Hz.

The radio signal may be any type of signal that is used to convey intelligence (data).

Preferably, the communications system further comprises customer premises equipment (CPE) in said one or more remote locations, wherein the remote modem of said at least one PLT station in the network segment conveys at least one of the first and the second media signals to or from said customer premises equipment by a radio frequency link.

It should be further noted that data networks can be connected through media such as coaxial cable, shielded and unshielded twisted-pair wires, fiber optics, and across wireless radio links. One method of transporting packetized data wirelessly is specified by the IEEE 802 standards committee, and is known in the art as 802.11. Three separate modulation and protocol sets are 802.11a, 802.11b, and 802.11g. These standards specify the formats and protocols used at OSI layers 1 and 2 for transport of any packetized data across the specified wireless network. The 802.11b and 802.11g protocols use the 2.4 GHz spectrum, while the 802.11a protocol uses the 5.8 GHz spectrum.

The 802.11 standards provide for two modes of operation: master/slave, and peer-to-peer. In the master/slave mode of operation, nodes wishing to use the wireless transport must associate with an access point. All data is transported to and from the access point, so that of two wireless nodes want to communicate, the data must go from one node to the access point, and then to the other node. In the peer-to-peer mode of operation, also known in the art as "ad-hoc", no access point is used. In this case any node may transmit data to any other node.

Advantageously, the radio frequency link of said remote modem has a radio frequency footprint commensurate with the physical footprint of the network segment.

Advantageously, the communications system further comprises: a plurality of further network segments (10a, 10b, 10c . . . ), and one or more repeaters (50, 51), each repeater spanning two network segments and having means for receipt of the first (downstream) RF signals for transfer from one network segment to another network segment and further having means for receipt of the second (upstream) RF signals for transfer from the another network segment to the one network segment.

Advantageously, the first network segment PLT station and second network segment PLT controller forming said repeater are housed in a computer and communicate with each other via the back-plane of the computer.

Alternatively, the first network segment PLT station and second network segment PLT controller forming said repeater are physically separated from each other and communicate with each other via a communication link, wherein the communication link is a wireless link, or a wire link separate from the medium voltage cable. Such a repeater is referred to herein as an interlink.

Advantageously, the communications system further comprises means for permitting the communication system to communicate with a wide area network, wherein said means for communicating with a wide area network is a router that operatively communicates with the PLT controller. Advantageously, the router is remote from said PLT controller, and the PLT controller and the router communicate with each other by a wireless link, or by a wire link, such as a fiber optic link.

Advantageously, the network segments may physically overlap on at least a portion of the medium voltage cable.

The PLT controller controls upstream media signals of PLT stations within its network segment by preferably controlling assignment of time division multiple access time slots.

Advantageously, each adjacent network segment uses a different region of a common physical layer encoding scheme, and the physical layer encoding scheme is a time division multiple access encoding scheme, or a frequency division multiple access scheme, wherein the frequency division multiple access encoding scheme is Orthogonal Frequency Division Multiplexing. Furthermore, the physical layer encoding scheme is Code Division Multiple Access with Collision Avoidance, or uses wavelets. The present invention also provides a method for providing a broadband communications between a distribution center and one or more remote locations in a communications network, the distribution center and remote locations together defining a network segment, where a medium voltage cable of an electrical power distribution system serves as a communication channel (medium) for the network segment.

The method according to the present invention comprises the steps of: providing broadband communications between a distribution center and at least one remote location, together defining a network segment, where a medium voltage (MV) cable of an electrical power distribution system serves as a communication channel (medium) for the network segment, the communication method comprising the steps of:

at the distribution center:
receiving a first (downstream) media signal so as to generate a first (downstream) RF signal that is modulated by said first media signal and demodulating a second (upstream) RF signal so as to extract a second (upstream) media signal,
exciting said MV cable with the first (downstream) RF signal,
receiving the second (upstream) RF signal on the MV cables,
controlling generation of the first (downstream) media signal so as to cause at least one of the at least one remote location to extract the first (downstream) media signal, and
controlling the generation of a second (upstream) media signal at the at least one remote location so as to instruct one remote location of said at least one remote location to generate the second (upstream) RF signal containing the second (upstream) media signal; and at each remote location:
receiving the first (downstream) RF signal if it is intended for the remote location;
demodulating the first (downstream) RF signal so as to extract the first (downstream) media signal, and generating the second (upstream) media signal, and
modulating an RF signal with said second media signal to form the second (upstream) RF signal, and exciting the MV cable with said second (upstream) RF signal.

The present invention will become apparent upon reading the description taken in conjunction with FIGS. 2a to 13.

BRIEF DESCRIPTION OF THE DRAWINGS

FIG. 3 is a schematic representation illustrating a repeater being used for bypassing an RF barrier.

FIG. 6a is a schematic representation illustrating a repeater having a plurality of components housed in a computer.

BEST MODE FOR CARRYING OUT THE INVENTION

Figure 1:
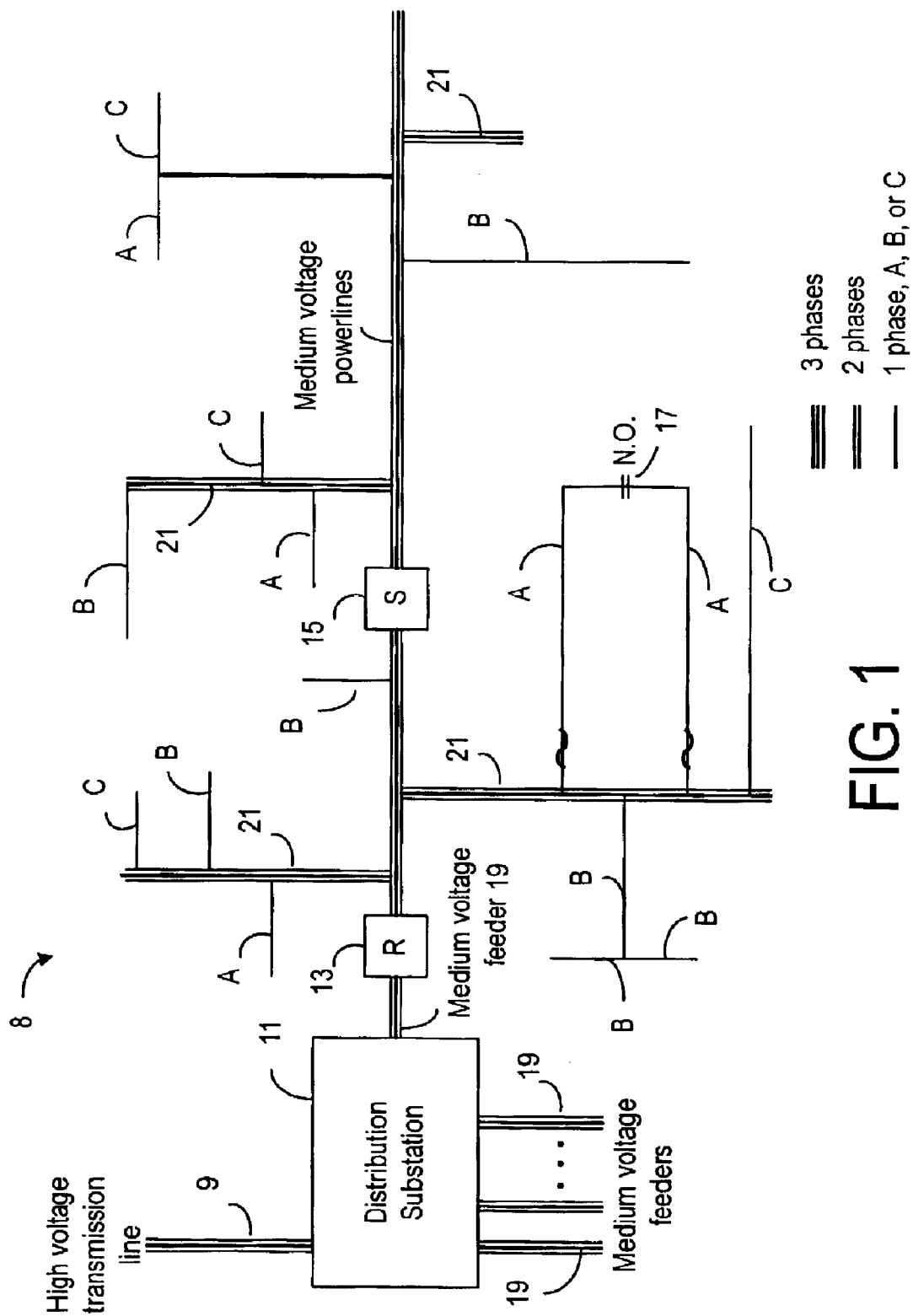
FIG. 1 is a schematic representation illustrating a topology of a medium voltage power distribution system.

FIG. 1 illustrates the physical topology of a typical power distribution network 8. Incoming high voltage power is provided over high voltage transmission lines 9. A distribution power substation 11 receives this high voltage power and converts it to medium voltage, (typically 4 to 50 kV) power. This medium voltage (MV) power is distributed on MV feeders 19. A typical feeder may have multiple branches (called "laterals" 21) as shown in FIG. 1. These feeders can extend for many kilometers, such as 25 kilometers (15.54 miles).

FIG. 1 also shows that a typical MV feeder includes various automatic switch gear, such as reclosers (R) 13, sectionalizers (S) 15, and disconnect elements 17. As is known in the art, reclosers act like circuit breakers so as to protect feeders from overload. Sectionalizers 15 and disconnect elements 17 are switches which are typically used to isolate a faulty section of a feeder and to re-route the feeder line path. A typical disconnect element 17 can therefore act as a normally open (NO) switch, which can be commanded to close when a feeder path has developed a fault, thereby providing an alternate path for the feeder to receive MV power.

All of these MV elements can provide impediments to PLC communications as discussed below.

Figure 2A:
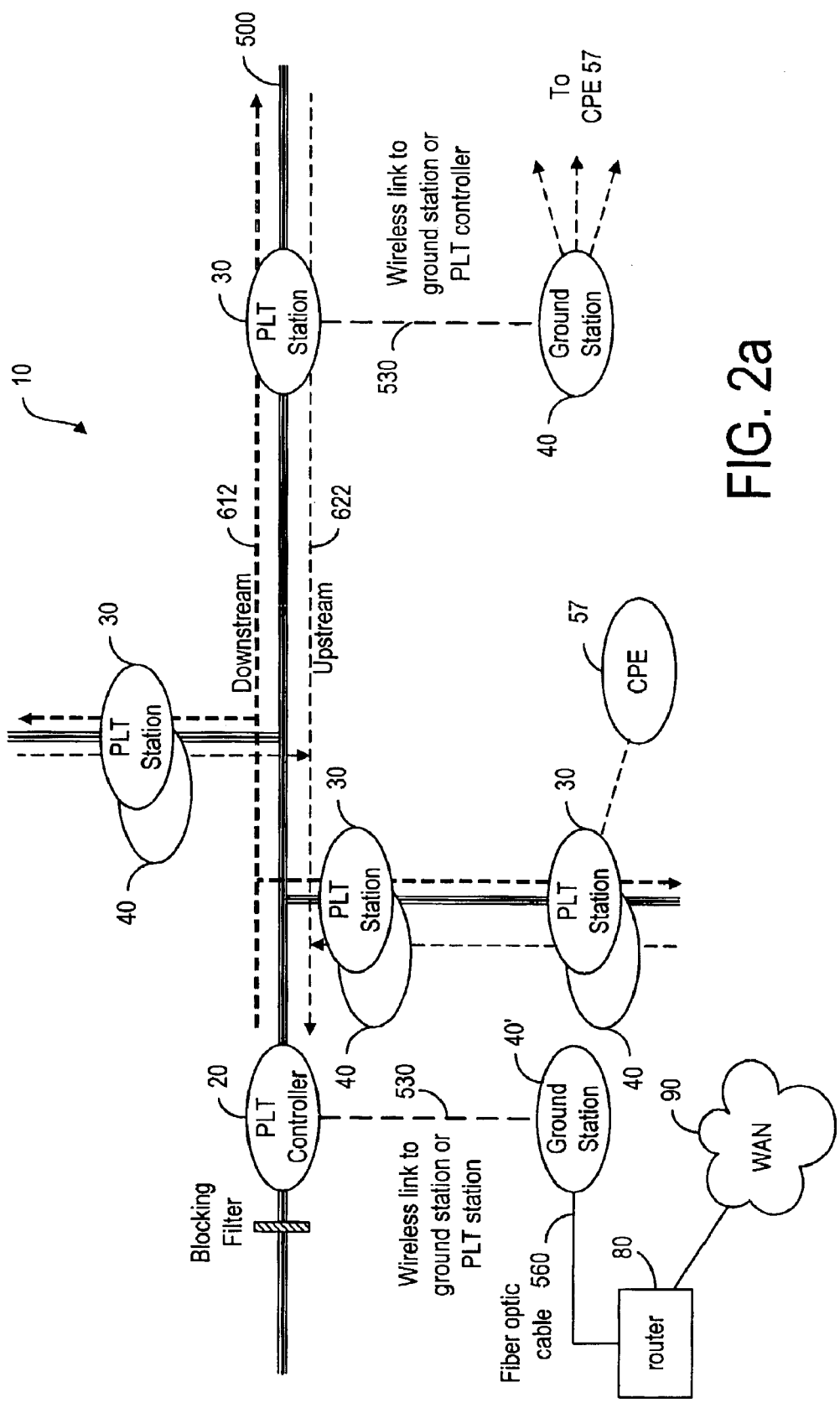
FIG. 2a is a schematic representation illustrating a power-line network segment, according to the present invention.

As seen in FIG. 2a, the basic building block for the MV (Medium Voltage) power line communications (PLC) that use the infrastructure of a power distribution network 8, is a PLC network segment 10, controlled by a single power line telecommunications (PLT) controller 20 and connected to one or more PLT stations 30 using the MV power line cables 500. It should be noted that the PLC network segment is not necessarily the same as the power distribution network 8 or its feeders 19. A network segment is both a physical network implementation and a logical network construct. It is a physical implementation in the sense that segments are physically constructed using the power distribution lines or cables as the physical communications medium, and may be concatenated (with bridges). The segments may be overlapped or nested. It is a logical network construct in that a segment represents a data traffic management domain, implemented at the Media Access Control (MAC) layer. The MAC layer protocol may incorporate a unique identifier (segment ID) to enable the protocol to reject foreign frames leaking into the segment, or alternatively may utilize MAC addresses to identify traffic between segment member devices.

Figure 2B:
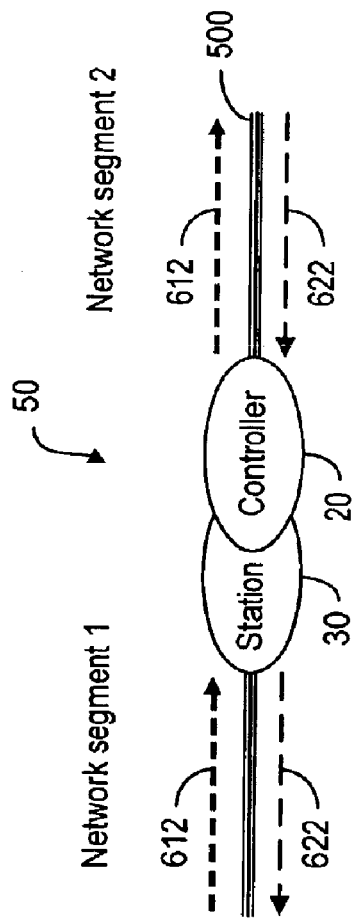
FIG. 2b is a schematic representation illustrating a repeater.
Figure 4:
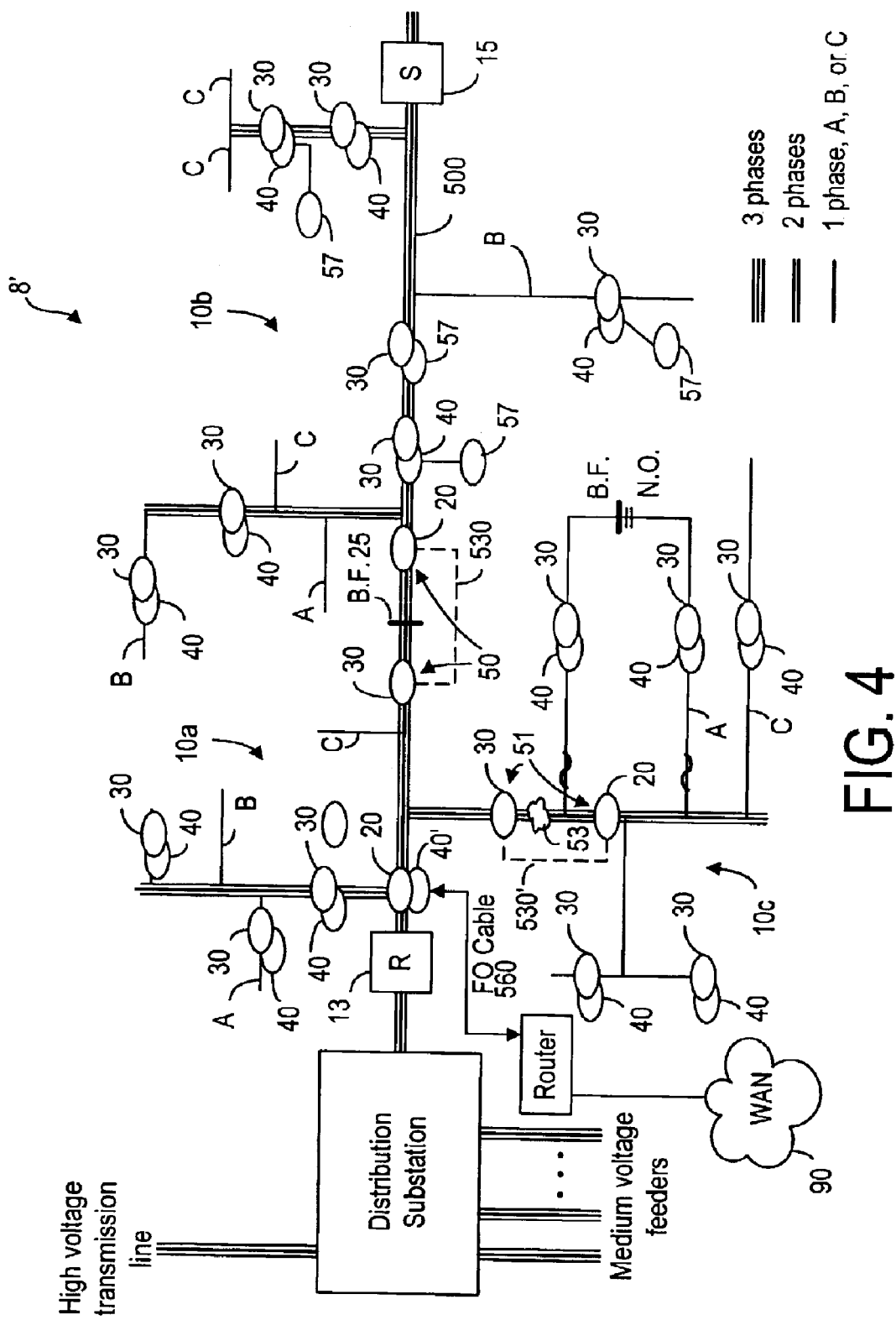
FIG. 4 is a schematic representation illustrating an inter-link between network segments in a network topology, according to the present invention.
Figure 6B:
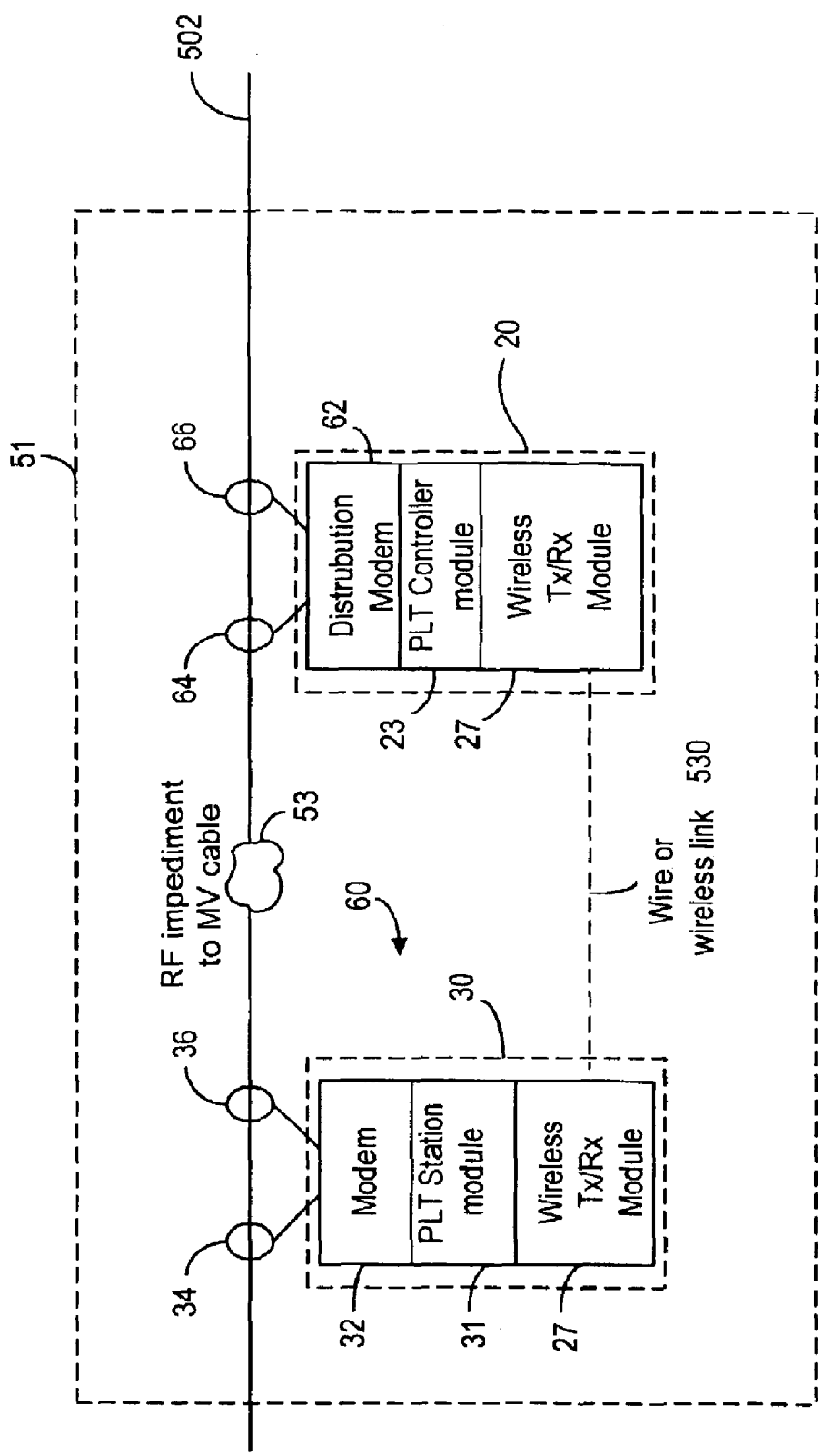
FIG. 6b is a schematic representation illustrating a repeater having physically separately components spanning an RF impediment.

Preferably, both the PLT controller 20 and the PLT station 30 have IEEE 802.11x (where x means any of the specific IEEE wireless standards, e.g. a, b or g) wireless ports that may be used to connect to wireless ground stations 40. As seen in FIGS. 2b, 3 and 4, a single PLT station 30 may also connect to the PLT controller 20 of another segment to form a repeater 50 that allows downstream and upstream communications to be transferred from one network segment to another without using the PLC communication medium (MV cable). As seen in FIGS. 4 and 6b, in some situations PLC switch equipment (reclosers 13, sectionalizers 15, disconnect elements 17) or other environmental factors may form an impediment 53 to the transfer of RF signals on an MV cable (though AC power is able to flow). To bridge such areas of RF impediments, an interlink 51 is used. An interlink is the same as a repeater but typically uses a wireless communication link 530 between the PLT station and the PLT controller which are physically separated from each other. In this manner an RF impediment can be bridged by the interlink connecting one network segment to another network segment, regardless of the physical length of the RF impediment since the wireless communication link 530 effectively spans the RF impediment. Alternatively, the communication link 530 may be by wire (electrical or optical). If by conductive wire, this conductive link is not in electrical contact with the MV cable 502.

As seen in FIG. 3, repeater 50 can be used to span the network segments, even when an RF blocking filter 25 is inserted on the MV cable between the network segments (e.g. 10a and 10b). Such an RF barrier may at some point in time become economically viable for purposes of separating the radio frequency signals of adjacent network segments. At the present time, such RF barriers are not economically feasible and thus the RF signals of at least adjacent network segments overlap, and to that extent the network segments themselves overlap and/or can be nested within each other. A repeater is still required to communicate between network segments since each RF signal (download or upload) contains information that associates that signal with the network segment in which it was generated and would therefore be otherwise ignored by a different network segment. With such repeaters, broadband communications services can be provided over a plurality of network segments.

The network segment is typically polarized by FDMA (Frequency Domain Multiple Access) allocations to form downstream and upstream channels. The PLT controller transmits all of the data (sometimes referred to herein as "media signal") in the downstream direction to the PLT stations on its segment. The PLT stations only transmit in the upstream direction to their segment PLT controller. Both the PLT controller and the PLT station are typically full-duplex devices on the power line network, although a half-duplex implementation of controllers and stations would be readily apparent to a person having ordinary skill in the PLC communications art. PLT stations only communicate with the PLT controller of its network segment unless it is part of a repeater 50 or interlink 51, in which case the PLT station is further able to communicate with the PLT controller of the repeater or interlink by means of a forwarding mechanism. Such a forwarding mechanism, as discussed above, includes backplane based communications using a computer bus architecture well-known in the art; wireless communications (e.g. 802.11x); and even wire communications (e.g. fiber optic cable or conductive wire using a high-speed serial link, for instance).

Power utilities typically want to avoid fiber optic cables between the PLT devices and the ground stations. Thus, wireless connections are preferable. However, fiber optic cables and other techniques could also be used.

Figure 2C:
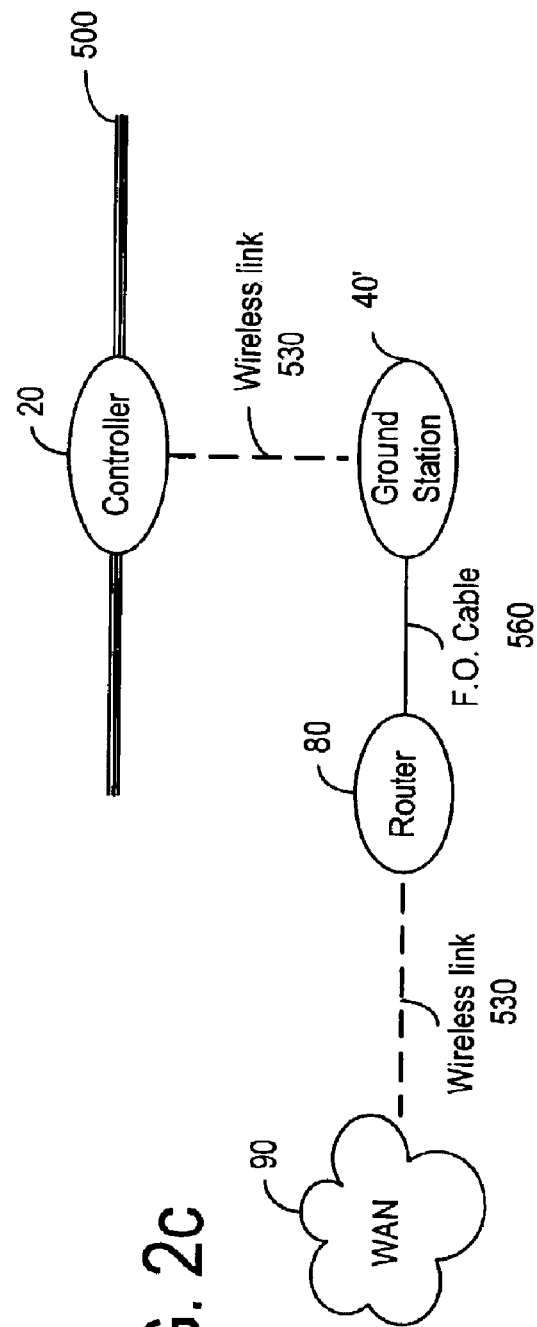
FIG. 2c is a schematic representation illustrating communications among a router, a controller and a wide area network.

The network segment 10 is the basic building block of the communications system, according to the present invention. As shown in FIG. 2a, a single controller 20 manages each network segment 10, including controlling access by associated PLT stations 30 regarding transmission of packets on the network segment. A PLT controller 20 may be connected by a wireless link 530 to a head-end ground station 40'. The head-end ground station 40' that is linked to a controller 20 typically has a communication link (such as a fiber optic cable 560) to a router 80 (see FIG. 2c) in order to provide access to a wide area network 90, such as the Internet. Multiple PLT controllers may each have such access to a wide area network.

Figure 5:
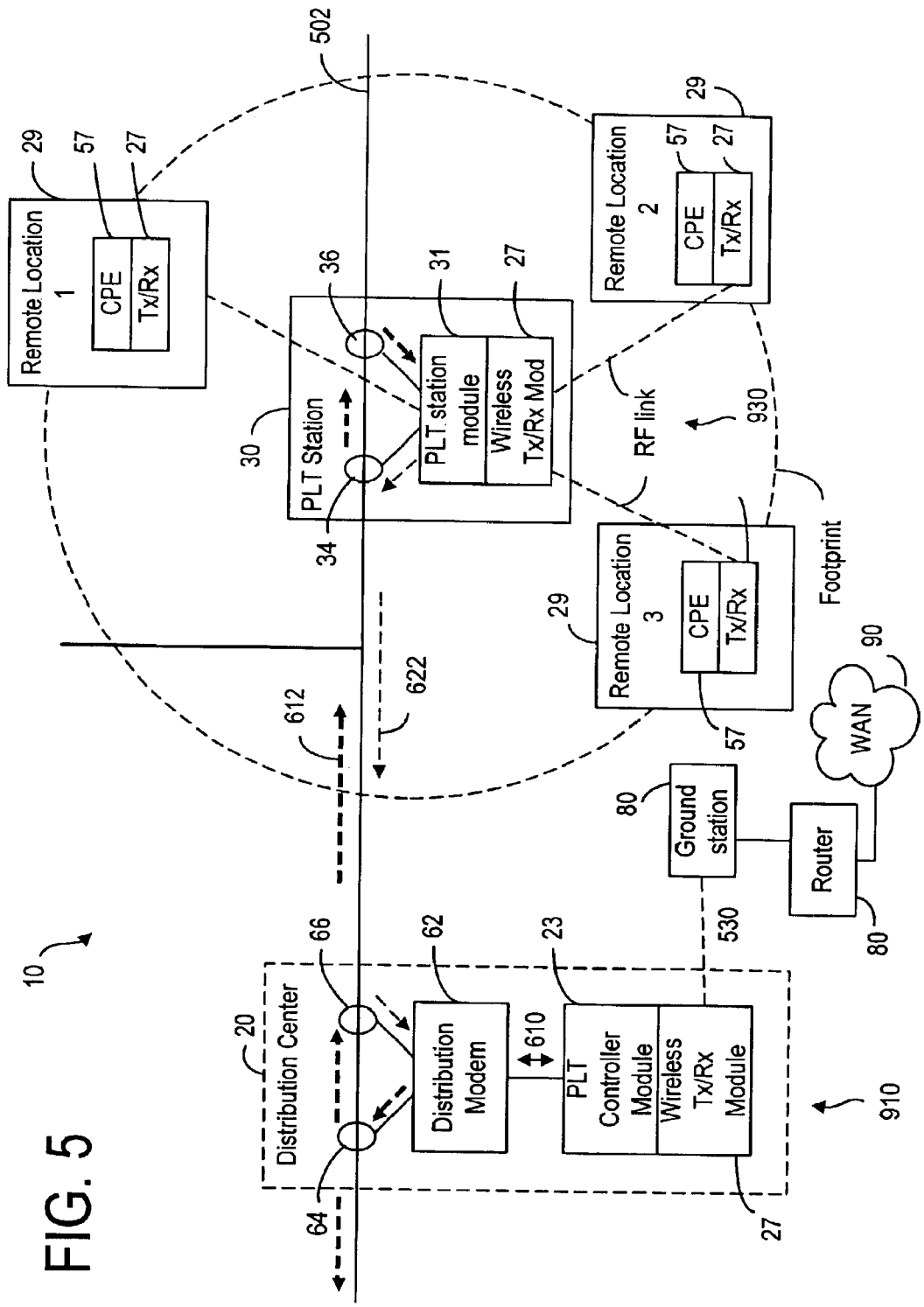
FIG. 5 is a schematic representation illustrating various communications components in a power-line network segment, according to the present invention.

A ground station 40 that is linked to the PLT station 30 (e.g. via a wireless link) typically links to customer premises equipment (CPE) 57 (see FIG. 4) either through a wireless link, or by other short distance link (e.g. fiber optic, Ethernet, Low Voltage Power Line communications segment) (only three ground stations are shown linked to CPE 57, although this can also be the case for the other ground stations shown). As seen in FIGS. 4 and 5, a PLT station 30 can also communicate directly to Customer Premises Equipment (CPE) 57, typically via a wireless transceiver module 27 in both the PLT station and CPE. Furthermore, a repeater 50, as shown in FIG. 2b and FIG. 3, comprises a PLT station 30 and a PLT controller 20 for extending the broadband services from one segment to another, without the need of wireless links or ground stations.

As shown in FIG. 4, interlink 51 comprises PLT station 30 in network segment 10a and PLT controller 20 in the network segment 10b, which can communicate with each other via a wireless link 530 in order to bypass both the sectionalizer "S" and possibly a blocking filter 25 (BF), which, as discussed above, may be used to prevent RF signals of one network segment (10a) from interfering with RF signals of an adjacent network segment (10b or 10c). Likewise, another interlink 51 can be used to bypass an RF impediment. If no RF impediment is present, a repeater 50, such as shown in FIG. 6a, can be used to allow communications between these two network segments.

FIG. 5 shows the various communications components in a communications system for providing broadband communications between a distribution center (PLT controller 20) and one or more remote locations 29. Although only one PLT station 30 is shown in FIG. 5, multiple PLT stations can be associated with one PLT controller 20 to form a network segment 10. The network segment 10 has a distribution center 60 at a first location 910 where PLT controller 20 is located, and at least one PLT station 30 at one or more remote locations 930. As shown in FIG. 5, a single medium voltage cable 502 of the electrical power distribution system serves as a communication channel (medium) for the network segment 10. However, it is possible to use two or more of the medium voltage cables 500 (see FIG. 3) to serve as the communication channel (medium). The controller 20 has a distribution modem 62 for receiving a media signal 610 from a PLT controller module 23. The modem modulates a radio frequency (RF) signal with the media signal 610 to form a downstream modulated RF signal 612. The radio signal 610 can be any type of intelligence (data) including audio and video data, or another type of data. The PLT controller also has a first coupler 64, which mounts over the medium voltage cable 502 and is connected to the distribution modem 62 in order to inductively excite the medium voltage cable with the downstream modulated RF signal 612. Although inductive coupling is shown, it is known in the art that capacitive coupling can also be used to excite the MV cable with intelligence or to receive such intelligence from the MV cable. The PLT controller 60 also comprises a second coupler 66, which is inductively excitable by an upstream modulated RF signal 622 on the medium voltage cable 502 so as to allow the distribution modem 62 to extract a media signal (not shown) from the upstream modulated RF signal 622 by demodulation.

As shown in FIG. 5, the PLT station 30 at the remote location 930 includes a third coupler 34 connected to a remote modem 32 to receive the downstream media signal 610 from the downstream modulated RF signal 612, and a fourth coupler 36 connected to the remote modem 32 to impart the upstream modulated RF signal 622 onto the medium voltage cable 502.

The PLT controller 20 controls each of the PLT stations 30 in the network segment 10 with respect to upstream communication. Each PLT station further includes a PLT station module 31 and typically a wireless transceiver module 27 for conveying the upstream and downstream media signals to customer premises equipment 70 by a radio frequency link via an IEEE 802.11a wireless port, for example. The radio frequency link of the wireless transceiver module 27 can have a physical footprint 700 commensurate with the network segment 10.

The PLT controller controls downstream and upstream communications with the PLT stations by typically controlling time slots of a time division multiplexing (TDM) protocol. In the preferred embodiment of the present invention, these TDM techniques are used in a master-slave relationship. One or more poll lists are maintained by the PLT controller with the associated addresses (identifiers) of PLT stations that wish to communicate with the PLT controller. Asynchronous contention based access is provided to allow a PLT station to join a poll list if it desires to communicate with the PLT controller.

Thus, the PLT controller can use time slots to transfer first RF signals to specified PLT stations. The same first RF signal can be sent to multiple PLT stations, if desired, by use of time slots corresponding to those stations. This is sometimes referred to as a broadcast message.

The PLT controller can also allow a PLT station to generate a second (upstream) media signal by designating a certain time slot for such transfers.

If a first RF signal is intended for a station outside of the present network segment, the PLT controller can, by use of the appropriate time slot, instruct a PLT station forming part of a repeater 50 or interlink 51 to extract the first media signal and to then transfer it to the PLT controller forming the remaining part of the repeater or interlink. In this way downstream media signals are transferred from one network segment to the next.

Similarly, a second (upstream) RF signal intended for a station outside a particular network segment can be transferred from the PLT controller forming part of a repeater or interlink to the PLT station of that repeater or interlink. The PLT station can then transfer the second RF signal to the PLT controller within the network segment of the PLT station for further transfer of the second RF signal to its intended destination.

With the communications system as depicted in FIGS. 4, 5, 6a and 6b, data can be sent simultaneously upstream and downstream through the same medium voltage cable, typically using different bands of frequencies. This full duplex broadband service between the locations may simultaneously supply a variety of communications needs, such as telephone service, video service, internet service and other services requiring high speed data transfers.

It should be noted that in the network segment, as shown in FIG. 5, the distance between the PLT controller 20 and particular PLT station 30 may be several kilometers depending upon electrical noise conditions.

Implementation of the Present Invention

Specific details of network devices, protocols, interface to link layer and security issues regarding the implementation of the present invention are given below. It should be noted that these details may be varied in various ways without departing from the scope of the invention. Such specific implementation details are known to those skilled in the art in view of the details presented.

1. Network Devices 1.1 Backhaul Router

The router 80, as depicted in FIGS. 2a, 2c, 4 and 5, provides routing between the backhaul connection (to a wide area network 90). A network segment does not have to have a router associated with its PLT controller if that network segment is connected to one or more other network segments.

1.2 Head-End Ground Station 40

As seen in FIG. 2a, the head-end ground station 40 is a wireless access point (for example, an IEEE 802.11a access point), in a translating bridge configuration. Other wireless standards can of course be used, including IEEE 802.11b and 802.11g. The head-end ground station provides a low voltage level access mechanism to link to the MV power line, without compromising safety mechanisms by making a galvanic connection to the MV power line. For a head-end ground station wirelessly linked with a PLT controller, there is either single or dual fiber optic cable ports to connect it with the backhaul router. The head-end ground station typically supports a network management interface, for example SNMP (Simple Network Management Protocol).

1.3 Ground Station 40

The wireless ground station is an IEEE 802.11x access point, in a translating bridge configuration. The ground station provides a low voltage level access mechanism to link to the MV power line, without compromising safety mechanisms by making a galvanic connection to the MV power line. For ground stations wirelessly linked with PLT stations, the ground station links to customer premises equipment 57 either wirelessly, or by use of some other medium. The ground station should support a network management interface, for example SNMP.

1.4 PLT Controller 20

As seen in FIG. 2a, the PLT controller 20 is a translating bridge that links the MV power line network with the wireless access point in the ground station, or with an upstream network segment station to form a repeater 50 or an interlink 51. It receives all of the upstream traffic transmitted by the stations on its segment, and it transmits all of the downstream traffic to stations on its segment. It controls the access of all of the stations on its segment to transmit their data, by controlling assignments to the TDMA (Time Division Multiple Access) slots used to carry the upstream traffic. Each segment has a single controller, but may have multiple PLT stations.

The PLT controller may be deployed in or near the power substation on the three-phase medium voltage feeder. Alternatively, it may be deployed on single-phase or three-phase branches off the feeder, and be connected to the backhaul router though a fiber-optic cable. In this configuration, fiber-optic cable is laid along the MV feeder to connect with the associated wireless ground station. The PLT controller typically supports a network management interface, for example SNMP.

1.5 PLT Station 30

The PLT station 30 is a translating bridge that links the power line network to the wireless ground station, or to the controller of another (downstream) segment to form an interlink. The wireless station embedded in the PLT station is a wireless access point, that normally associates with the ground station access point, but which may support direct association with customer premises equipment (eliminating the need for the ground station connection). The PLT station receives data forwarded by its segment controller and it transmits data from its wireless port to the controller of its segment, in designated TDMA slot(s), for example. The PLT station typically supports a network management interface, for example SNMP.

1.6 Repeater 50 and Interlink 51

As seen in FIG. 3, the repeater 50 is a transparent bridge that receives PLC traffic (communications) and retransmits it in the same direction. It comprises a PLT station 30 and a PLT controller 20. The repeater receives the power line RF signal, decodes it to a MAC frame, and re-encodes it to retransmit it in the same direction. Converting from analog to digital allows more sophisticated signal processing. A repeater typically supports a network management interface, for example SNMP. An interlink 51 is the same as a repeater 50 except that it can span an RF impediment 53 on the MV cable.

2. Signal Linkage

2.1 Wireless Bypass of Line Impairments (Impediments)

Figure 7:
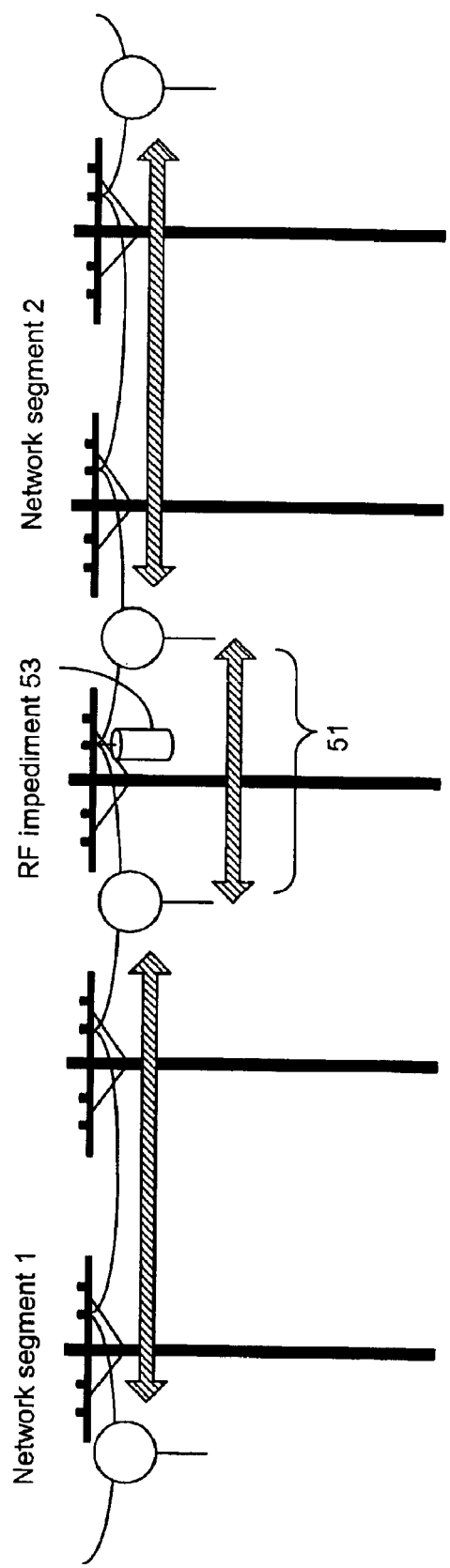
FIG. 7 is a schematic representation illustrating wireless bypass of channel impairment.

The medium voltage cable may include impairments (impediments) to radio frequency data transmission which need to be bypassed in order to further propagate the radio frequency signal down the medium voltage cable. Interlinks are used to bypass said impediments. A typical wireless bypass of channel impairment is schematically depicted in FIG. 7 via an interlink.

2.2 Wireless Uplink

Figure 8:
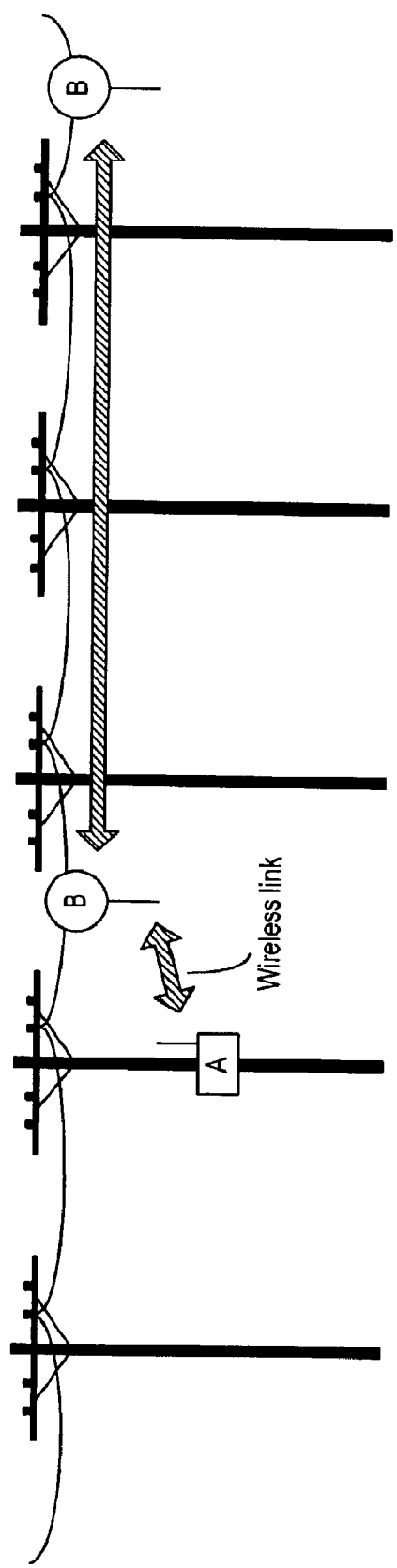
FIG. 8 is a schematic representation illustrating a wireless uplink.

The signal source for the medium voltage cable does not originate on the medium voltage cable. A method of transmission of the signal from the signal source (media source) to the distribution modem for modulation and injections onto the medium voltage cable is required to form an end-to-end communication path. For example, the media signal can be originated from the WAN 90 and is conveyed to the PLT controller 20 via the router 80, as shown in FIG. 5. A wireless uplink is also schematically depicted in FIG. 8.

2.3 Wireless Downlink

Figure 9:
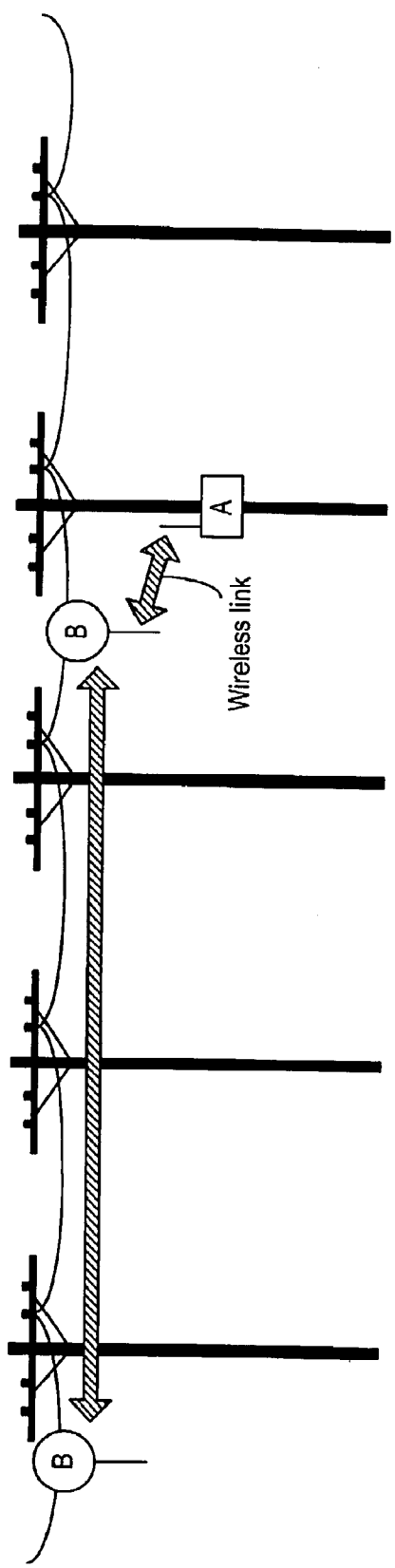
FIG. 9 is a schematic representation illustrating a wireless downlink.

The signal destination for the medium voltage cable does not terminate on the medium voltage cable. A method of transmission of the signal from the distribution modem 62 to the signal destination is required to form an end-to-end communication path. For example, the downstream media signal modulated by the distribution modem 62 is conveyed to the CPE 52 via the medium voltage cable 502 and then the remote modem 32 of the PLT station 30, as seen in FIG. 5. A wireless downlink is schematically depicted in FIG. 9.

Underground MV Cable Embodiment

Figure 10A:
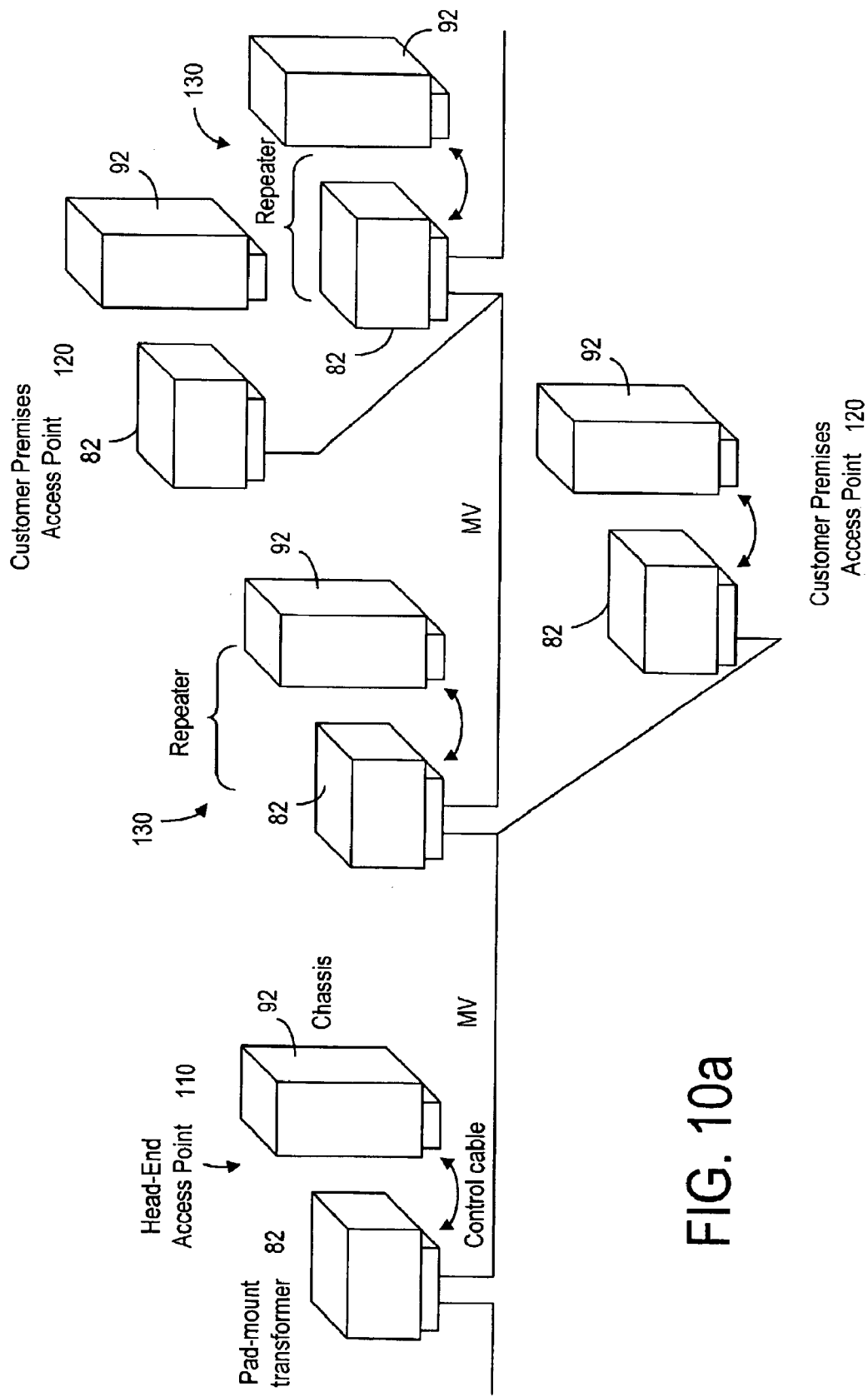
FIG. 10a is a schematic representation illustrating a communications system using an underground MV cable.
Figure 10B:
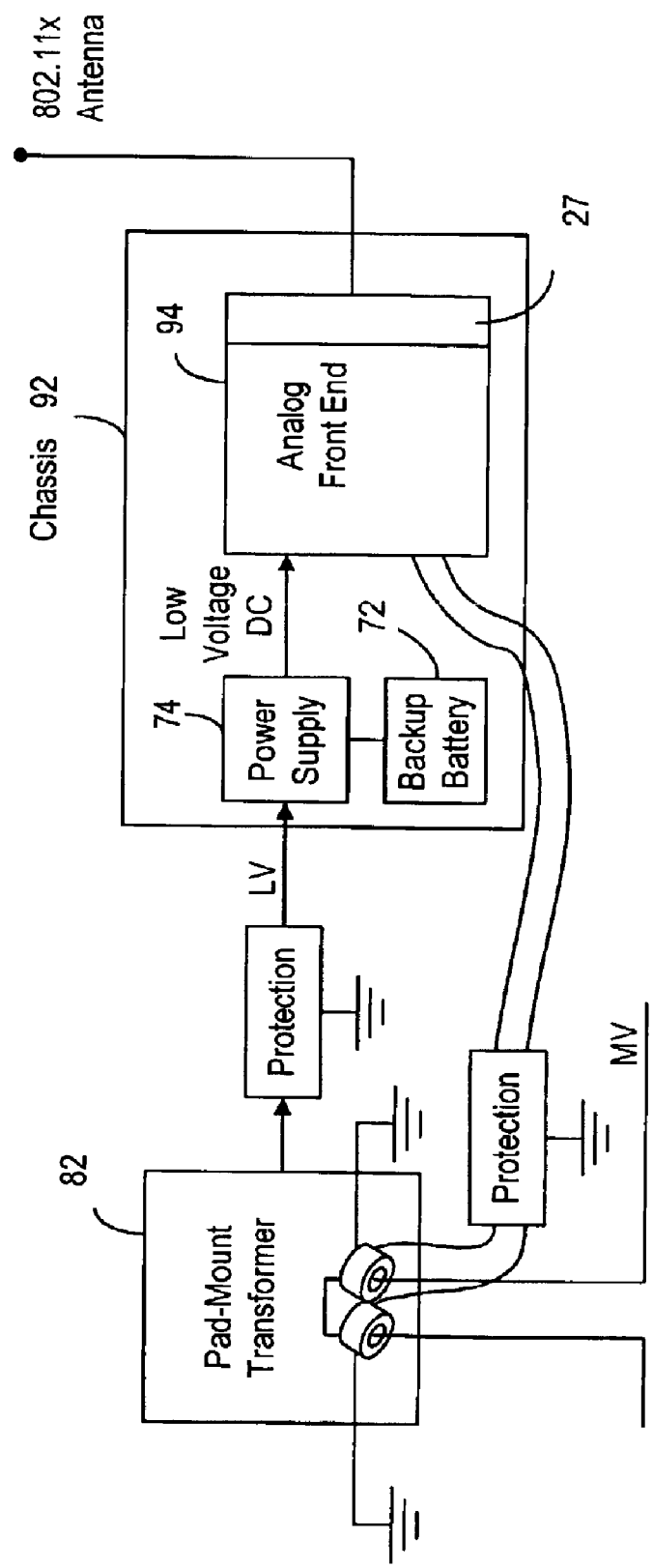
FIG. 10b is a schematic representation illustrating a network component associated with the underground communications system.
Figure 11:
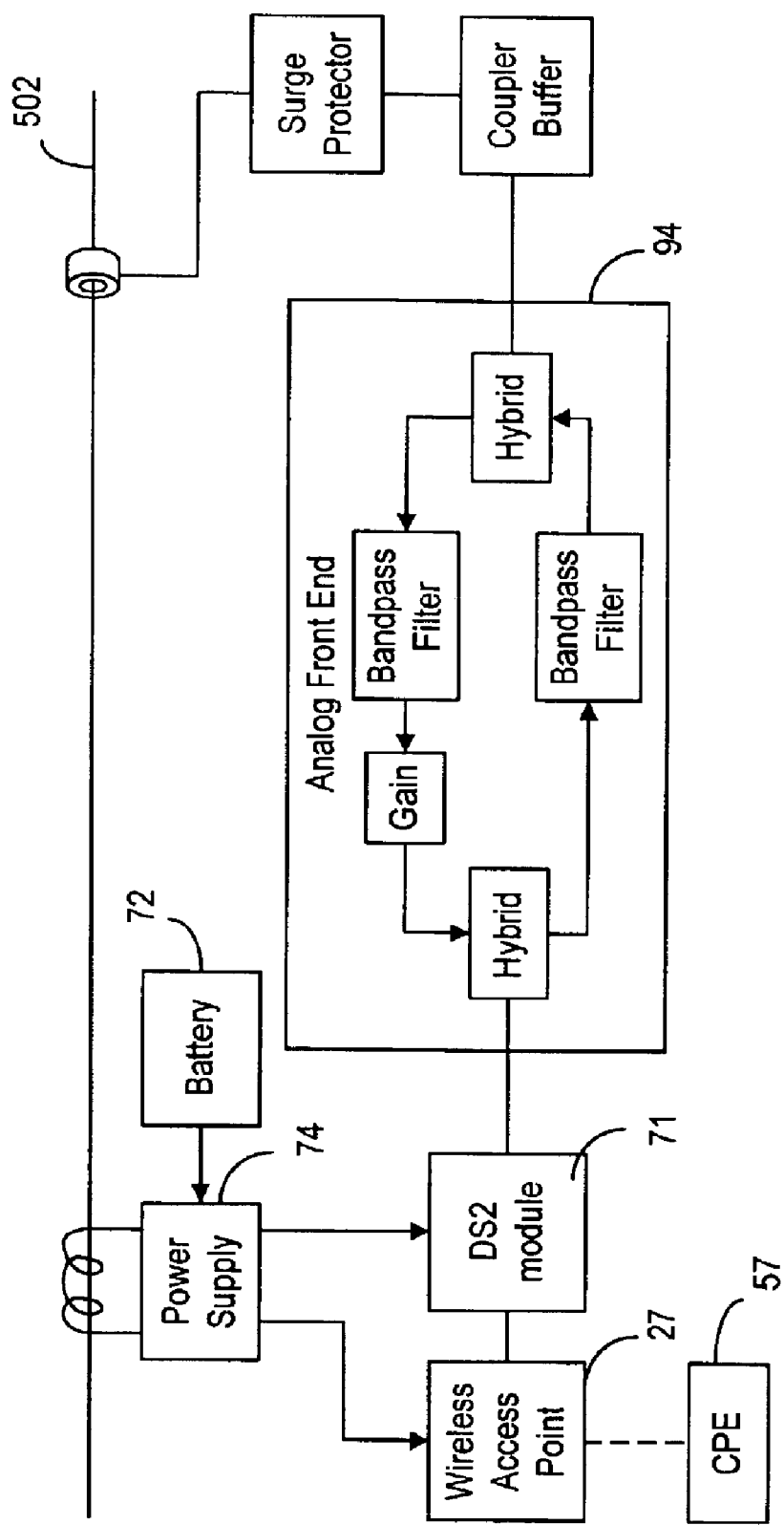
FIG. 11 is a schematic representation illustrating an electronics box associated with the underground communications system.
Figure 12:
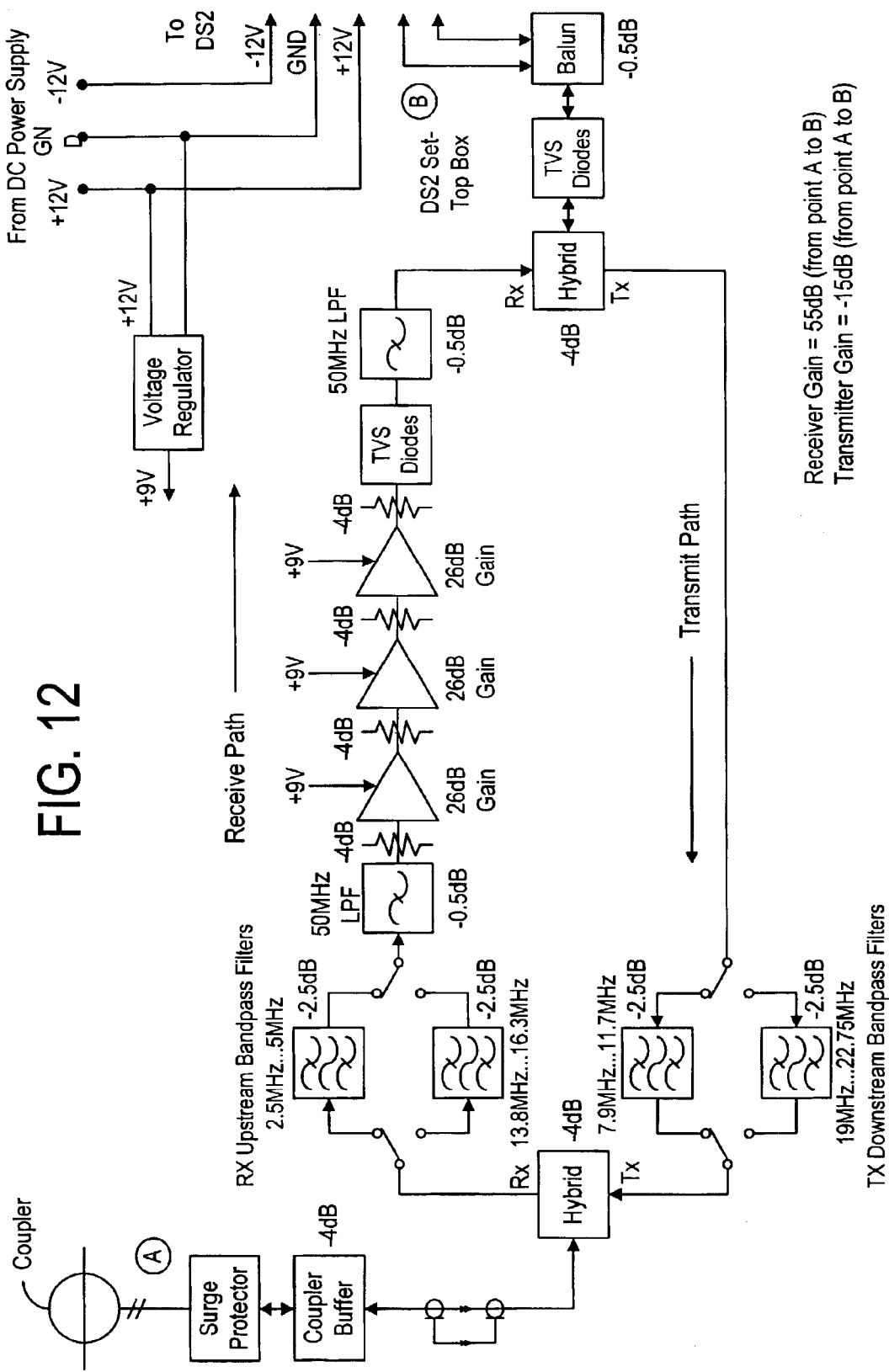
FIG. 12 is a circuit diagram showing one version of the analog front-end.
Figure 13A:
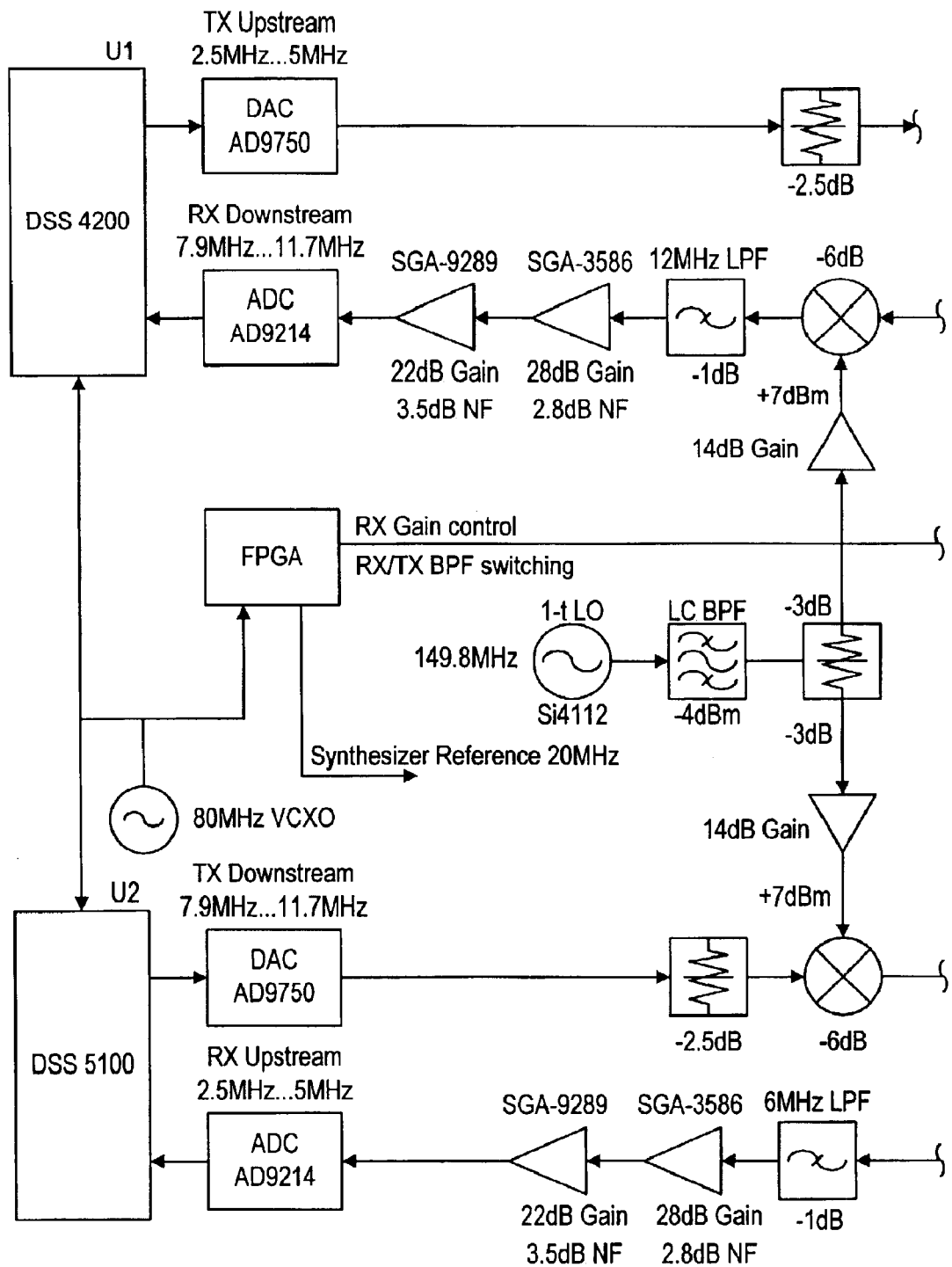
FIG. 13a is a section of a circuit diagram showing another version of the analog front-end.
Figure 13B:
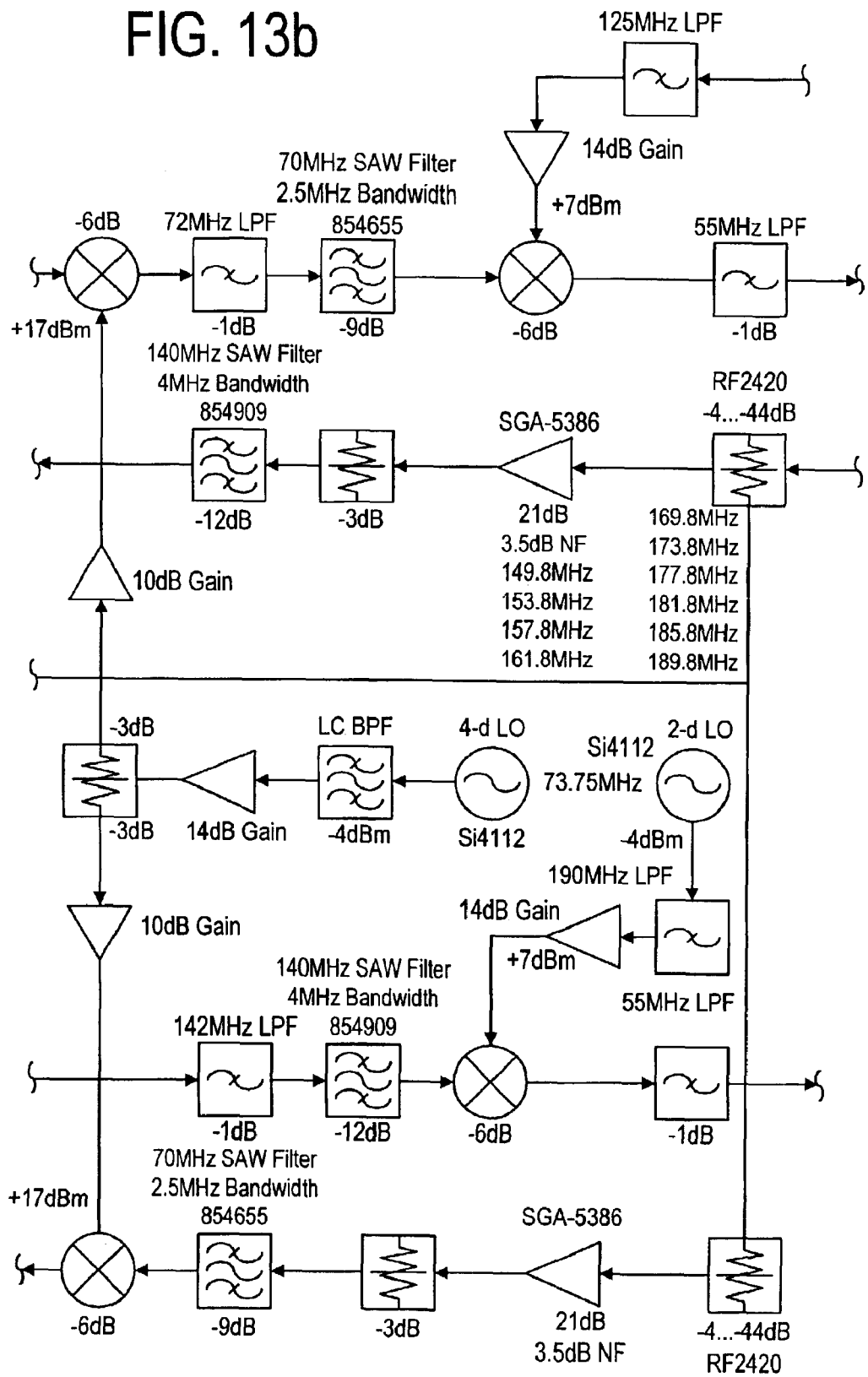
FIG. 13b is another section of the circuit diagram.
Figure 13C:
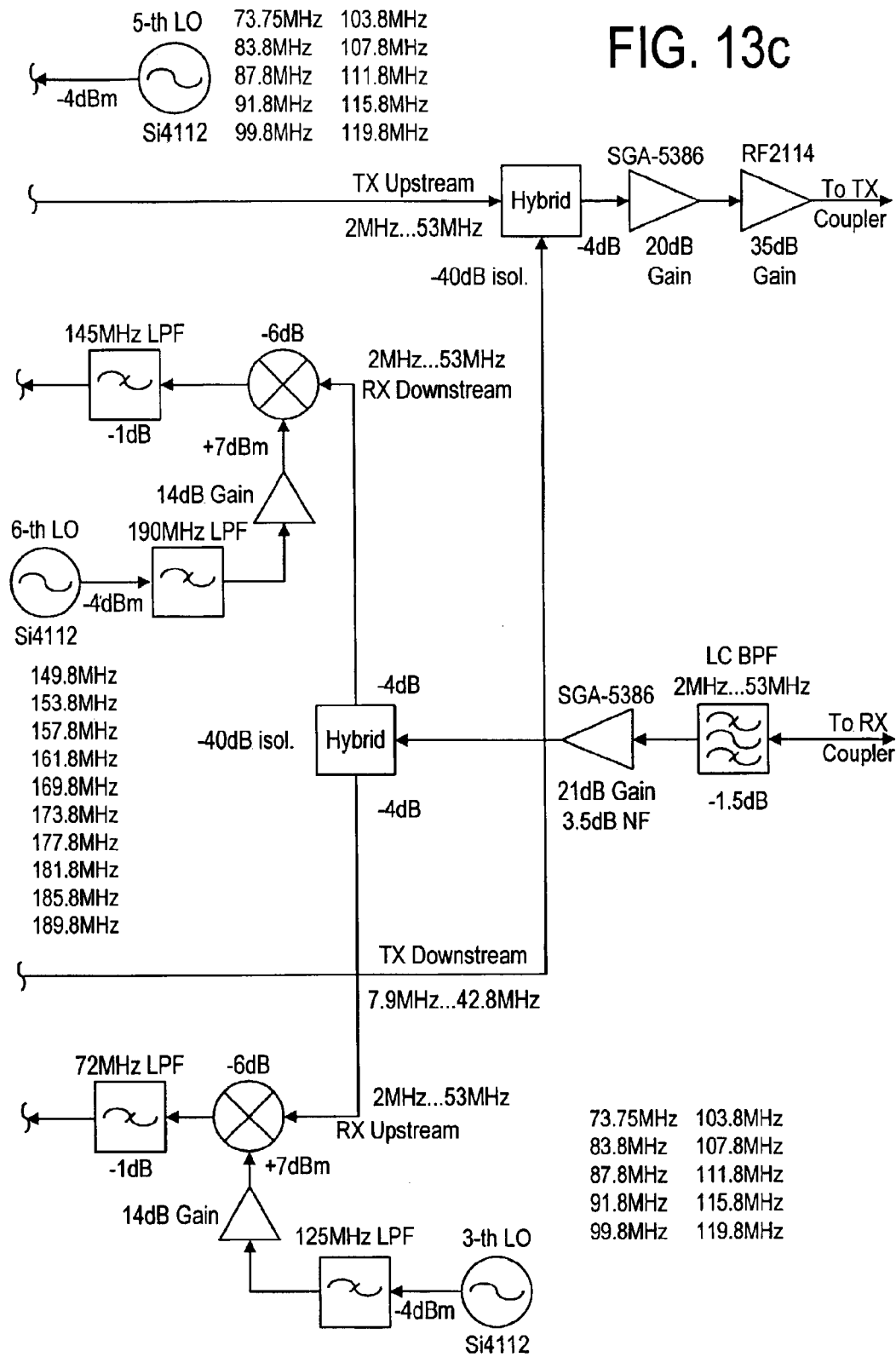
FIG. 13c is yet another section of the circuit diagram.

The PLC system for providing broadband communications using a medium voltage cable, according to the present invention, has been described in conjunction with an overhead MV distribution system. However, the same invention can be implemented using an underground MV distribution system or a combination of overhead and underground MV distribution systems. Schematically, the communications system using an underground MV power cable is shown in FIGS. 10a and 10b. As shown in FIG. 10a, at the head-end access point 110, customer premises access points 120, signal repeating sites 130, a pad-mount transformer 82 is used to impart or receive a modulated RF signal on or from the MV power cable, and a chassis 92 are connected to the transformer 82 for processing the modulated RF signal. As shown in FIG. 10b, a pad mounted transformer comprises a transmit coupler 84 and a receive coupler 86, similar to the couplers 34, 36, 64 and 66, as depicted in FIG. 5. The chassis 92 comprises an analog front end module 94 for processing the modulated RF signals to and from the couplers, and at least one power source 72, 74, and an optional backup battery 72 for powering module 94. Module 94 serves as data link between the head-end access point 110 and the customer premises access point 120, as shown in FIG. 10a. Further details are shown in FIG. 11. A DS2 CPE module 71 uses a chip set manufactured by DS2 of Valencia, Spain for modulation/demodulation of the media signal. One version of the analog front-end is shown in FIG. 12, and another version is shown in FIGS. 13a to 13c.

3. Protocols

3.1 Physical Layer

Two broadband physical layer (PHY) encoding methods are: Orthogonal Frequency Division Multiplexing (OFDM) and spread spectrum, as in CDMA/CA (Code Division Multiple Access with Collision Avoidance). OFDM may offer significant performance advantages over CDMA, because of its greater spectral efficiency.

In either case, additional signal processing is used to improve the effective signal-to-noise ratio, and provide robustness in the presence of significant impulse noise. Only the OFDM approach is described here.

A PHY layer can be implemented in a manner similar to that in the HomePlug® standard, or the 802.11a standard (OFDM), including a frame structure that has logically separate frame control and frame data blocks, and separate forward error correction encoding for each. The following description gives an indication of the amount of signal processing applied to improve the effective signal-to-noise ratio.

3.1.1 Transmitter Processing

In the transmitter, the Frame Control encoding uses a product encoding matrix and bit interleaver, while the frame data is passed through a scrambler, followed by a Reed-Solomon encoder, then a convolutional encoder, a bit puncturer, and finally, a bit interleaver. It is also possible to replace the default bit interleaver with the HomePlug® ROBO interleaver for enhanced robustness in a high noise environment. The ROBO interleaver introduces another 4-fold redundancy into the encoded data.

The encoded frame control and frame data bit streams are mapped to the available OFDM carriers in the frequency domain, and converted to analog RF signals in the time domain, using an inverse fast Fourier transform.

Modulation schemes include Quadrature Amplitude Modulation (QAM) (e.g. QAM16 through QAM1024), Coherent BPSK (Bi-Phase Shift Keying) for frame control bits, and DBPSK (Differential Bi-Phase Shift Keying) or DQPSK (Differential Quadrature-Phase Shift Keying) for data bits. Coherent BPSK and DBPSK encode 1 bit per carrier in each symbol. DQPSK encodes 2 bits per carrier per symbol, but is less robust. If the estimated channel characteristics permit, the more efficient modulation schemes and encoding schemes are used. Modulation schemes are dynamically selected to optimize communication over a given channel.

3.1.2 Receiver Processing

In the receiver, the received RF signal is sampled and converted to a digital representation, then mapped to the frequency domain with a fast Fourier transform. The transform is converted to polar representation and demodulated. Frame control symbols are de-interleaved and the product matrix encoding is reversed by a product decoder. Data symbols are de-interleaved, de-punctured, and passed successively through a through a Viterbi Decoder, a Reed-Solomon Decoder and a descrambler.

3.2 Media Access Control Layer

The Media Access Control (MAC) layer has several major functions to perform as described below.

3.2.1 Link Initialization

The controller manages initialization of the PLT network segment. On power-up, the controller begins periodically broadcasting an invitation to join its segment. When a station receives the join invitation, it responds in the appropriate upstream slot (specified in the invitation) with a request to join the segment.

Because of the possibility of leakage of MAC frames from one network segment to another, a mechanism is implemented to prevent inappropriate association between stations and controllers in different segments during the initialization process. The simplest approach is to provision both controller and stations with the same segment number, before they are permitted to transmit on the power line. Normal MAC procedures intended to prevent receipt of foreign segment frames will prevent the stations from responding to an inappropriate controller and will also prevent the controller from accepting an inappropriate station.

After a station has responded to an invitation to join the segment, the controller initiates the Channel Estimation Control Function described below to evaluate optimal carrier and modulation for downstream traffic to the station. The station also initiates a Channel Estimation Control Function to evaluate the optimal carrier and modulation for upstream traffic it will send to the controller.

The initial communication between the controller and a station uses a default carrier selection and modulation scheme, chosen to maximize the probability that each device will be able to receive transmissions from the other. After the Channel Estimation Control function has been completed, the selection of carriers and the modulation scheme may be changed to improve the channel efficiency.

3.2.2 Channel Estimation Control Function

The channel or connection between the controller and a station can be unique with respect to the viability of tones (carriers) and the acceptability of various modulation methods. Therefore, a means to discover the attributes of a channel is required.

A controller initializing a new connection to a station, or a station initializing a new connection to a controller prepends a Channel Estimation Request Entry to the MAC protocol data unit (MPDU) transmission. On receipt of that request, the receiving entity (controller or station) analyzes the characteristics of the first PHY block to determine the optimal set of tones and modulation for the connection. The receiving entity returns this information to the requester. On receipt of the Channel Estimation Response, the original requesting entity uses that configuration for all further transmissions to the receiver, until the expiration of the Valid Channel Estimation timeout, or until the connection experiences a predetermined number of errors in the timeout period.

For an existing connection, upon expiration of the Valid Channel Estimation timeout, both the controller and the station in the connection perform a new channel estimation procedure. This method effectively monitors the "health" of the connection and adapts it for optimal data communication under changing environmental conditions.

The initial channel estimation request for new connections is transmitted by a station using the contention based access slot. The controller responds to the request within the Controller_No_Response timeout period. If the requesting station does not receive a response within the timeout period, it picks a random backoff count between 1 and 16, and waits that many contention slots before requesting the Channel Estimation procedure again. On repeated no-response timeouts, the backoff count is taken from an increasing range of counts, the range increasing by a factor of two for each repetition, up to a range of 1 . . . 256. Note that the station may not transmit until it has received synchronization information broadcast by the controller.

HomePlug® distributes 128 carriers over a 20 MHz band, then selects 84 of the carriers from approximately 4 MHz to 20 MHz to form channels. Carrier selection and modulation schemes are selected after the channel estimation process. These selections are made on a link by link basis between each pair of communicating nodes on the network.

The PLT may be able to use more than 20 MHz of bandwidth, but may have to implement multiple concurrent downstream channels and multiple concurrent upstream channels in order to support channel hopping that may be required for realization of repeaters, or to reduce the effects of inter-segment leakage of frames.

3.2.3 Link Upstream Synchronization Function

The controller is responsible for establishing an orderly allocation of upstream TDMA slots for required QOS (quality of service) and fair usage by segment stations.

On initialization, the controller begins broadcasting a MAC synchronization beacon frame that contains a description of the current number of contention-free TDMA slots, their size(s) in symbols (the only significant time-related unit of measure that does not depend on the modulation scheme selected is the OFDM symbol), and the size of the contention-based access slot, which follows the contention-free slots. The size of a slot must be large enough to accommodate a PHY block. Multiple slots may be concatenated to contain a packet fragment with a guard time larger than the worst case round trip time on the segment, and margin for local clock skews. Defaults may be needed, and the controller may measure the segment round trip times and broadcast more appropriate slot configurations. The controller broadcasts a new synchronization beacon at the start of each new sequence of slots. Individual stations hold their transmissions until they receive the controller's beacon and have delayed the required number of slot times to begin transmitting in their assigned slot(s) or in the contention-based slot(s).

3.2.4 Link Upstream Access Initialization

A station may not transmit in the contention-free slot(s) until it has been given an allocation by the PLT controller. The station begins the allocation process by requesting slots for a class of service and average bit rate, and quantity of data to transmit. The request is transmitted during the contention-based access slot time. The controller attempts to allocate TDMA slots to fill the request.

In principle, only the initial transmission allocation request from a station will have to contend for access. Additional requests for continued, or increased upstream allocations are piggy-backed on current upstream transmissions. Allocations may expire when the requested amount of data has been transferred, unless they have been extended. Separate, concurrent, allocations are required when a station is transmitting traffic requiring different classes of service.

3.2.5 Collision Resolution

Requests for access to the upstream channel by stations in a segment are transmitted in one or more time slots reserved for contention access. A station succeeding in gaining access is notified by the segment controller, and given the appropriate slot allocation information. A station failing to gain access detects this either by detecting a slot allocation directed to another station, or by no allocation response within a maximum allowed time-out. The station failing to gain access recalculates the contention slot number it next uses to request access.

Two different mechanisms can be used for this collision resolution function: (a) a random back-off algorithm; and (b) a p-persistent algorithm. In the random exponential back-off algorithm, each new attempt to gain access selects the delayed slot it will use by randomly picking a number from an increasing range of delays. In the p-persistent, the probability that the station will request access in the next slot is inversely related to the number of stations in the segment. A random number is generated and evaluated, such that only one of n picks, on average, will permit use of the next contention slot. Both methods are in use in the IEEE 802.14 standards approach.

3.2.6 Link Status Function

PLT stations need to be able to periodically report on their perceived link status. This can be achieved by including a field in the MAC header, or by requiring the controller to periodically poll the stations for their current link status (the preferred method is to return link status embedded in normal station traffic.)

3.2.7 Packet Fragmentation and Reassembly

Long packets are more likely than short packets to be affected by noise causing bit errors. There is an optimal size packet that can be transmitted for a given bit error rate. The optimal size packet is also influenced by the retransmission mechanism used to recover from errors.

The PLT MAC transports up to 4096 bytes of packet data. (The maximum packet size should be at least the size of a maximal Ethernet packet (1504+VLAN/QOS/MPLS layer 2 extensions), but could be larger to support "jumbo" packets. Furthermore, there is no particular reason to limit the maximum packet size to that specified by Ethernet, as other ANSI standards have specified a larger (4 kbyte) packet size.) Packets longer than 128 bytes are fragmented into 128 byte fragments for transmission (smaller fragments have higher probability of being successfully transported in a noisy physical environment). MAC layer segment transport may be configured to be connection-oriented, or connectionless.

For connection-oriented transport, fragments are numbered sequentially to aid in re-assembly. Lost or errored unicast fragments may be retransmitted. Separate sets of fragment numbers are maintained for each source/destination connection (and class of service allocated.) Fragment numbers are typically eight bits in length (the minimum useful range of fragment numbers is a function of maximum MAC frame size and the fragment size). A windowed acknowledgement system can be used. The size of the fragment numbering field must be large enough so that the number cannot wrap around during the worst case system delay. The transmit window should be less than one-half the maximum fragment sequence number value.

Repeat transmission has consequences for TDMA slot allocation algorithms. In the case where the controller has determined that a particular station's transmitted fragment has been lost or corrupted, it can make adjustments in the slot allocation for that station, to permit repetition, without collision with another allocation. For automatic repetition of fragments sent by the controller, the slot allocation algorithm needs to allocate at least one more slot after the transmission appears to be complete, to allow the receiving station to acknowledge the last fragment. The controller implements a time out to wait for an acknowledgement of a final fragment. Further, the MAC frame needs an indicator $Last_{13}$ Fragment, to inform either the controller or the station that a bare acknowledgement frame is required. Normally the MAC frame in a connection-oriented transmission carries acknowledgements for the most recently received fragment, along with the next fragment.

3.2.8 Network Segment Identification

The basic network building block is a power line segment that contains a single controller and one or more stations. Packets from nearby power line network segments may appear on a segment, either through leakage along the shared power line conductors or through capacitive coupling from long parallel line paths for different network segments. Each MAC protocol packet contains a field for the locally unique identifier assigned to the controller managing the segment. In this way, each station on the segment can identify "foreign" packets and reject them (except when signals are intended to span adjacent network segments by use of repeaters or interlinks). The ID is typically globally unique to avoid configuration and installation problems. By default, the controller PLT MAC address is used as the segment ID. The segment ID field is optional in cases where intersegment leakage of packets is considered to be inconsequential.

3.2.9 MAC Addressing

MAC addresses is typically globally unique and 48 bits long, in order to facilitate compatibility with other IEEE 802.2 standard compatible LAN implementations. Smaller addresses may be usable, but this alternative carries management and configuration issues, to guarantee that no two MACs in the same network (i.e., all connected segments) have the same address.

4. MAC Services Interface to Link Layer

The MAC services interface is compatible with standard IEEE 802.3. As in HomeLink®, it may be desirable to register an Ethernet Frame Type for MAC to MAC protocol negotiations. The MAC supports IEEE 802.2 standard Type I Connectionless service to the LLC.

5. Security and Privacy

Security begins at the firewall at the outer edge of the protected local area network. Once the user traffic crosses to the access network, it has only the protections that were provided by the user's own network (for example, application level encryption, or high level security protocols, like IPSec, or tunneling protocols implementing Virtual Private Networks, or by use of the SSL protocol.) There is no way to secure an access network.

The power line network is an access network, not a local area network. So it does not need to provide security for user traffic. The power line network is just a small part of the path that user traffic traverses in crossing the Wide Area Network between the source and destination, and therefore most of the path is typically not secure.

In order to move data between low voltage, or near ground potential, and the medium voltage power line, without making a direct (galvanic) connection to the power line, another medium is needed, such as wireless or fiber optic cable. Normal access to the power line network is through ground stations typically implemented as IEEE 802.11a wireless access points. The existing 802.11 access security, Wired Equivalent Privacy (WEP) can be used.

At most, steps can be taken to minimize the potential for "theft of services" by enabling WEP and disabling broadcast system IDs in access points of the present invention. Association with a given wireless network may be controlled through an authentication process, for example, though a remote RADIUS server managed by the owner of the power line network or the access points. Even then, the access remains vulnerable to MAC address spoofing. WEP encryption can be 128-bit encryption, and keys can be changed when the packet count for packets encrypted with a given key exceed 10,000 to 100,000 packets. (It has been verified that the 128-bit encryption of WEP can be broken by examination of 1–5 million packets, which can be collected from an active 802.11b node in a few hours, and analyzed in a few minutes on a common laptop computer. The 40-bit encryption exhibits the same problems as the 128-bit encryption, but is much easier to break.)

The possibility exists that someone using the appropriate custom equipment might be able to sniff the emitted RF radiation from the power line network. In this case, nothing is compromised: secure communications between local area networks using higher level protocols remain secure. The sniffing is undetectable, and there is no theft of service. It should be noted that the ability to access PLT frame data by exploiting RF radiation, at all, implies an uncommon technical sophistication and access to substantial hardware and software resources, which should rule out casual observation of PLT traffic.

The possibility exists that someone might attach foreign equipment at the secondary of a power distribution transformer to exploit RF leakage through the transformer to access the network. To guard against possible theft of service, new nodes should be authenticated before allowing them to send and receive data over the network. This could be implemented, as in the wireless case, by acquiring permissions from a remote RADIUS server managed by the owner of the power line network. The only remedy to prevent sniffing, in this case, is encryption of the user payload.

The degree of difficulty of sniffing traffic on the PLT network can be raised by a modest level of encryption of MAC frame payload data (e.g., using single DES encryption, with a 43-bit or 56-bit key). The encryption can be segment-wide, using a common key within the segment, and different keys for different segments. The user data can be encrypted on entering a PLT segment and only be decrypted on exiting the PLT segment. A repeater would not encrypt or decrypt frames passing through it, so keys would be shared between segments created by insertion of repeater(s).

The PLT segment is a logical network. It has a segment identifier that can be used to reject foreign MAC frames that may leak into the segment. Optional segment-wide encryption of MAC payload data, may be provided for privacy or security reasons.

Summary

According to the present invention, a data signal at a first location is transmitted via a wireless link to a radio frequency distribution modem residing on a medium voltage cable. An RF signal at the distribution modem is modulated with the data signal and coupled to a medium voltage cable serving as a transmission channel or medium for the modulated RF signal. At a second location, the radio frequency signal is coupled from the medium voltage cable to a demodulator for converting the modulated signal back to a data signal. The data signal is transmitted via a wireless link for further distribution. Such transmission of the data signal via a wireless link of course requires some form of modulation of a wireless signal.

Data is sent from the second location to the first location in a similar manner, typically using a different band of frequencies. The full duplex broadband service between the locations may simultaneously supply a variety of communications needs, such as telephone service, video service, internet service and other services requiring high speed data transfers. The MV cables can be overhead cables (e.g., on the top of utility poles), but they can also be located anywhere else, such as underground.

All of these communications are made by one or more network segments, each network segment having a PLT controller and one or more PLT stations. The PLT controller controls allocation of all downstream communications to the PLT stations as well as controls upstream communications from PLT stations to the PLT controller. Repeaters and interlinks allow communications between network segments. Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A communications system for providing broadband communications between a distribution center and at least one remote location, together defining a network segment, where a medium voltage (MV) cable of an electrical power distribution system serves as a communication channel (medium) for the network segment, the communication system comprising:

a power line telecommunications (PLT) controller having:
a distribution modem (62) for receiving a first (downstream) media signal so as to generate a first (downstream) RF signal that is modulated by said first media signal and for demodulating a second (upstream) RF signal so as to extract a second (upstream) media signal, the distribution modem including means (64, 66), in cooperative engagement with the MV cable, for exciting the MV cable with the first (downstream) RF signal for receiving the second (upstream) RF signal on the MV cable,
a power line telecommunications (PLT) controller module (23) operatively communicating with the distribution modem, having means for controlling the generation of the first (downstream) media signal so as to cause at least one of the at least one remote location to extract the first (downstream) media signal, the PLT controller module further having means for controlling the generation of a second (upstream) media signal at the at least one remote location; and at least one power line telecommunications (PLT) station (30), each station having:
- a second modem (32) for demodulating the first (downstream) RF signal so as to extract the first (downstream) media signal, the second modem having means (34, 36), in cooperative engagement with the MV cable for receiving the first (downstream) RF signal and for exciting said MV cable with the second (upstream) RF signal, and
- a PLT station module (31) operatively communicating with the second modem (32), having means for accepting the extracted first (downstream) media signal if the signal is intended for the PLT station; and further having means for generating the second (upstream) media signal for presentation to the second modem for modulation thereof to form the second (upstream) RF signal;

whereby the PLT controller controls generation of all first (downstream) RF signals for distribution to the at least one PLT station and further controls the generation of second (upstream) RF signals to the PLT controller from the at least one PLT station.

2. A communication system as claimed in claim 1, wherein time division multiplexing (TDM) is used by the PLT controller module to control generation of the first (downstream) media signal and as the means for controlling the generation of the second (upstream) media signal.

3. A communication system as claimed in claim 1, wherein the PLT controller further comprises a wireless transceiver module (27) for receipt and transfer of first and second media signals without use of the medium voltage cable.

4. A communications system as claimed in claim 1, further comprising customer premises equipment (CPE) in said at least one (70) remote location and wherein the second modem of said at least one PLT station in the network segment further comprises a wireless transceiver module (27) for receipt and transfer of the first and the second media signals to or from said customer premises equipment by a radio frequency link.

5. A communications system as claimed in claim 4, wherein the radio frequency link of said wireless transceiver has a radio frequency footprint commensurate with the network segment.

6. A communication system as claimed in claim 1, further comprising a ground station in communication with the PLT controller for receipt and transfer of first and second media signals with the PLT controller.

7. A communication system as claimed in claim 6, wherein the ground station in communication with the PLT controller further communicates with a router and wherein the router further communicates with a wide area network (WAN).

8. A communication system as claimed in claim 7, further wherein at least one of the at least one PLT station further communicates with customer premises equipment (CPE).

9. A communication system as claimed in claim 7, wherein at least one of the at least one PLT station communicates with a second ground station that in turn communicates with customer premises equipment (CPE).

10. A communications system as claimed in claim 1, wherein the communications system comprises:
- a plurality of further network segments (10a, 10b, 10c . . . ), and
- one or more repeaters (50, 51), each repeater spanning two network segments and having means for receipt of the first (downstream) RF signals for transfer from one network segment to another network segment and further having means for receipt of the second (upstream) RF signals for transfer from the another network segment to the one network segment.

11. A communications system as claimed in claim 9, wherein the repeater comprises a PLT station in a first network segment and a PLT controller in a second network segment, wherein first (downstream) RF signals from the first network segment intended for further downstream transfer have means for instructing the PLT station of the repeater to retrieve the first RF signal and to transfer it to the PLT controller of the repeater, and further wherein the second RF signals of the second network segment intended for further upstream transfer have means for instructing the transfer of the second RF signal from the PLT controller of the repeater to the PLT station of the repeater in such a manner that the PLT station of the repeater further transfers the second RF signal to the PLT controller of the first network segment.

12. A communications system as claimed in claim 11, wherein the first network segment PLT station and second network segment PLT controller forming said repeater are housed in a computer and communicate with each other via the backplane of the computer.

13. A communications system as claimed in claim 11, wherein the first network segment PLT station and second network segment PLT controller forming said repeater (interlink) each further have a wireless transceiver module (27), wherein the PLT station and the PLT controller communicate with each other via said wireless transceiver modules.

14. A communications system as claimed in claim 11, further having a fiber optic link, wherein the first network segment PLT station and second network segment PLT controller forming the repeater (interlink) communicate with each other via said fiber optic link.

15. A communications system as claimed in claim 11, further having a conductive link not in electrical contact with the MV cable, wherein the first network segment PLT station and second network segment PLT controller forming the repeater (interlink) communicate with each other via said conductive link.

16. A communications system as claimed in claim 1, further comprising means, associated with the PLT controller, for permitting the communication system to communicate with a wide area network.

17. A communications system as claimed in claim 16, wherein said means for communicating with a wide area network is a router that operatively communicates with the PLT controller.

18. A communications system as claimed in claim 17, wherein said router is remote from said PLT controller.

19. A communications system as claimed in claim 18, wherein the PLT controller and the router communicate with each other by a wireless transceiver module.

20. A communications system as claimed in claim 18, wherein the PLT controller and the router communicate with each other by a wire link.

21. A communications system as claimed in claim 20, wherein the wire link is a fiber optic link.

22. A communications system as claimed in claim 10, wherein the network segments may physically overlap on at least a portion of the medium voltage cable.

23. A communications system as claimed in claim 1, wherein the PLT controller controls generation of upstream media signals by PLT stations within its network segment by a first command that controls assignment of time division multiple access time slots.

24. A communications system as claimed in claim 10, wherein each adjacent network segment uses a different region of a common physical layer encoding scheme for generation of said first and second RF signals and wherein the PLT station of a repeater communicates with the PLT controller of the repeater using the encoding scheme of the network segment of said PLT controller and wherein the PLT controller of the repeater communicates with the PLT station of the repeater using the encoding scheme of the network segment of said PLT station.

25. A communications system as claimed in claim 24, wherein the physical layer encoding scheme is a time division multiple access time slots for transfer of first and second RF signals between the PLT controller and the at least one PLT station.

26. A communications system as claimed in claim 24, wherein the encoding scheme within each network segment further uses frequency division multiple access scheme.

27. A communications system as claimed in claim 26, wherein the frequency division multiple access encoding scheme is Orthogonal Frequency Division Multiplexing.

28. A communications system as claimed in claim 24, wherein the physical layer encoding scheme is Code Division Multiple Access with Collision Avoidance.

29. A communications system as claimed in claim 24, wherein the physical layer encoding scheme uses wavelets.

30. A communications system as claimed in claim 1, wherein the electrical power distribution system comprises an underground distribution system.

31. A communications system as claimed in claim 1, wherein the electrical power distribution system comprises an aboveground distribution system.

32. A communications system as claimed in claim 1, wherein the electrical power distribution system comprises a combined underground and aboveground distribution system.

33. A method of providing broadband communications between a distribution center and at least one remote location, together defining a network segment, where a medium voltage (MV) cable of an electrical power distribution system serves as a communication channel (medium) for the network segment, the communication method comprising the steps of:

at the distribution center:
  receiving a first (downstream) media signal so as to generate a first (downstream) RF signal that is modulated by said first media signal and demodulating a second (upstream) RF signal so as to extract a second (upstream) media signal,
  exciting said MV cable with the first (downstream) RF signal,
  receiving the second (upstream) RF signal on the MV cables,
  controlling generation of the first (downstream) media signal so as to cause at least one of the at least one remote location to extract the first (downstream) media signal, and
  controlling the generation of a second (upstream) media signal at the at least one remote location so as to instruct one remote location of said at least one remote location to generate the second (upstream) RF signal containing the second (upstream) media signal; and at each remote location:
  receiving the first (downstream) RF signal if it is intended for the remote location;
  demodulating the first (downstream) RF signal so as to extract the first (downstream) media signal, and
  generating the second (upstream) media signal, and
  modulating an RF signal with said second media signal to form the second (upstream) RF signal, and exciting the MV cable with said second (upstream) RF signal.

* * * * *

UNITED STATES PATENT AND TRADEMARK OFFICE
CERTIFICATE OF CORRECTION

PATENT NO. : 6,885,674 B2
DATED : April 26, 2005
INVENTOR(S) : Hunt et al.

It is certified that error appears in the above-identified patent and that said Letters Patent is hereby corrected as shown below:

Column 15,
Line 21, "through a through a" should be -- through a --.

Signed and Sealed this

Sixteenth Day of August, 2005

JON W. DUDAS
*Director of the United States Patent and Trademark Office*